US006839382B1

(12) United States Patent
Davis et al.

(10) Patent No.: US 6,839,382 B1
(45) Date of Patent: Jan. 4, 2005

(54) SYSTEM, METHODS AND COMPUTER PROGRAM PRODUCTS FOR IDENTIFYING DIGITAL IMPAIRMENTS IN MODEM SIGNALS USING SIGNATURE ANALYSIS AND SIGNAL LEVEL COMPARISON ANALYSIS

(75) Inventors: Gordon Taylor Davis, Chapel Hill, NC (US); Ajay Dholakia, Gattikon (CH); Dongming Hwang, Cary, NC (US); Malcolm Scott Ware, Raleigh, NC (US); Hua Ye, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/429,862

(22) Filed: Oct. 29, 1999

(51) Int. Cl.[7] ................................................ H04L 5/16
(52) U.S. Cl. ....................................... 375/222; 375/220
(58) Field of Search ................................. 375/222, 342, 375/357; 370/242, 280, 474

(56) References Cited

U.S. PATENT DOCUMENTS

| | | | |
|---|---|---|---|
| 3,557,308 A | 1/1971 | Alexander et al. | ......... 178/69.5 |
| 3,622,877 A | 11/1971 | MacDavid et al. | ....... 324/73 R |
| 3,683,120 A | 8/1972 | Schenkel | .................. 179/15 A |
| 3,729,717 A | 4/1973 | de Koe et al. | ........... 340/172.5 |
| 4,112,427 A | 9/1978 | Hofer et al. | ................ 340/347 |
| 4,132,242 A | 1/1979 | Carroll, Jr. | ................... 137/263 |
| 4,208,630 A | 6/1980 | Martinez | ....................... 375/7 |
| 4,237,552 A | 12/1980 | Aikoh et al. | ................... 370/83 |
| 4,270,027 A | 5/1981 | Agrawal et al. | .......... 179/81 R |

(List continued on next page.)

FOREIGN PATENT DOCUMENTS

| | | | |
|---|---|---|---|
| EP | 0 473 116 A2 | 8/1991 | ............ H04N/1/00 |
| EP | 0 659 007 A2 | 11/1994 | .......... H04M/11/06 |
| EP | 0 669 740 A2 | 12/1994 | ........... H04L/27/00 |
| FR | 2 345 019 | 3/1976 | ........... H04L/27/10 |
| WO | WO 96/18261 | 6/1996 | .......... H04M/11/00 |
| WO | WO 98/37657 | 8/1998 | |

OTHER PUBLICATIONS

Davis et al., Oct. 29, 1999, U.S. application No. 09/430, 217.*

Erup, et al., Interpolation in Digital Modems—Part II: Implementation and Performance, *IEEE Transactions on Communications,* vol. 41, No. 6, pp. 998–1008 (Jun. 1993).

Fischer, Signal Mapping for PCM Modems, *V–pcm Rapporteur Meeting,* Sunriver, Oregon, USA,, 5 pgs. (Sep. 4–12, 1997).

(List continued on next page.)

*Primary Examiner*—Stephen Chin
*Assistant Examiner*—Lawrence Williams
(74) *Attorney, Agent, or Firm*—Scott W. Reid; Myers, Bigel, Sibley & Sajovec, P.A.

(57) ABSTRACT

Digital impairments, including Robbed Bit Signaling (RBS) and impairments due to digital attenuation PAD (Packet Assembler/Disassembler) devices, may be identified in sets of Pulse Code Modulation (PCM) signal levels, such as sets of Digital Impairment Learning (DIL) signals transmitted from a server modem to a client modem during a plurality of DIL levels. Both signature analysis and signal level comparison analysis are preformed on the signals to identify digital impairments. Signature analysis compresses the set of signal levels into a signature. Digital impairments are determined based on the signature. In a preferred embodiment, the PCM signal levels are compressed into a signature by identifying clusters and/or skips. PCM signal level comparison analysis uses differences, between PCM signals and models of signals having various digital impairments. By using both techniques combination, the strengths of each technique are utilized while the weaknesses of each techniques are avoided.

48 Claims, 11 Drawing Sheets

U.S. PATENT DOCUMENTS

| | | | | |
|---|---|---|---|---|
| 4,434,322 A | 2/1984 | Ferrell ................... 178/22.13 |
| 4,450,556 A | 5/1984 | Boleda et al. ............... 370/58 |
| 4,577,310 A | 3/1986 | Korsky et al. ............... 370/58 |
| 4,578,796 A | 3/1986 | Charalambous et al. ....... 375/8 |
| 4,720,861 A | 1/1988 | Bertrand ..................... 381/36 |
| 4,731,816 A | 3/1988 | Hughes-Hartogs .......... 379/98 |
| 4,756,007 A | 7/1988 | Qureshi et al. ............... 375/37 |
| 4,760,598 A | 7/1988 | Ferrell ........................ 380/44 |
| 4,797,898 A | 1/1989 | Martinez ..................... 375/7 |
| 4,833,706 A | 5/1989 | Hughes-Hartogs .......... 379/98 |
| 4,868,863 A | 9/1989 | Hartley et al. ............... 379/98 |
| 4,884,285 A | 11/1989 | Heynen et al. ............... 375/25 |
| 4,890,303 A | 12/1989 | Bader ........................ 375/107 |
| 4,890,316 A | 12/1989 | Walsh et al. ................. 379/98 |
| 4,894,847 A | 1/1990 | Tjahjadi et al. ............. 375/121 |
| 4,901,333 A | 2/1990 | Hodgkiss ..................... 375/98 |
| 4,943,980 A | 7/1990 | Dobson et al. ............... 375/42 |
| 4,953,210 A | 8/1990 | McGlynn et al. ............. 380/48 |
| 4,967,413 A | 10/1990 | Otani ........................ 371/37.4 |
| 4,972,360 A | 11/1990 | Cukier et al. .......... 364/724.04 |
| 4,985,902 A | 1/1991 | Gurcan ........................ 375/14 |
| 4,991,169 A | 2/1991 | Davis et al. .................. 370/77 |
| 4,995,030 A | 2/1991 | Helf ......................... 370/32.1 |
| 5,005,144 A | 4/1991 | Nakajima et al. ........... 364/565 |
| 5,007,047 A | 4/1991 | Sridhar et al. ............. 370/32.1 |
| 5,014,299 A | 5/1991 | Klupt et al. .................. 379/98 |
| 5,033,062 A | 7/1991 | Morrow et al. ................. 375/7 |
| 5,038,365 A | 8/1991 | Belloc et al. .................. 375/8 |
| 5,040,190 A | 8/1991 | Smith et al. .................. 375/4 |
| 5,052,000 A | 9/1991 | Wang et al. ................. 371/43 |
| 5,058,134 A | 10/1991 | Chevillat et al. ............. 375/39 |
| 5,065,410 A | 11/1991 | Yoshida et al. ............... 375/98 |
| 5,067,125 A | 11/1991 | Tsuchida ..................... 370/79 |
| 5,068,875 A | 11/1991 | Quintin ....................... 375/78 |
| 5,107,520 A | 4/1992 | Karam et al. ................. 375/60 |
| 5,111,481 A | 5/1992 | Chen et al. ................... 375/14 |
| 5,119,401 A | 6/1992 | Tsujimoto .................... 375/14 |
| 5,119,403 A | 6/1992 | Krishnan ..................... 375/39 |
| 5,134,611 A | 7/1992 | Steinka et al. ................ 370/79 |
| 5,142,552 A | 8/1992 | Tzeng et al. ................. 375/14 |
| 5,157,690 A | 10/1992 | Buttle ......................... 375/14 |
| 5,187,732 A | 2/1993 | Suzuki ......................... 379/5 |
| 5,210,755 A | 5/1993 | Nagler et al. ............... 370/108 |
| 5,225,997 A | 7/1993 | Lederer et al. ............. 364/550 |
| 5,253,272 A | 10/1993 | Jaeger et al. ................. 375/60 |
| 5,253,291 A | 10/1993 | Naseer et al. ............... 379/406 |
| 5,265,151 A | 11/1993 | Goldstein .................... 379/97 |
| 5,285,474 A | 2/1994 | Chow et al. .................. 375/13 |
| 5,291,479 A | 3/1994 | Vaziri et al. ............... 370/58.2 |
| 5,311,578 A | 5/1994 | Bremer et al. ............... 379/97 |
| 5,317,594 A | 5/1994 | Goldstein ...................... 375/8 |
| 5,351,134 A | 9/1994 | Yaguchi et al. ............. 358/435 |
| 5,353,280 A | 10/1994 | Ungerböck ................ 370/32.1 |
| 5,386,438 A | 1/1995 | England ..................... 375/121 |
| 5,394,110 A | 2/1995 | Mizoguchi .................. 329/304 |
| 5,394,437 A | 2/1995 | Ayanoglu et al. ........... 375/222 |
| 5,398,303 A | 3/1995 | Tanaka ........................ 395/51 |
| 5,402,445 A | 3/1995 | Matsuura ................... 375/229 |
| 5,406,583 A | 4/1995 | Dagdeviren .................... 375/5 |
| 5,418,842 A | 5/1995 | Cooper ....................... 379/98 |
| 5,432,794 A | 7/1995 | Yaguchi ..................... 371/5.5 |
| 5,434,884 A | 7/1995 | Rushing et al. ............. 375/235 |
| 5,475,711 A | 12/1995 | Betts et al. ................. 375/240 |
| 5,491,720 A | 2/1996 | Davis et al. ................ 375/222 |
| 5,513,216 A | 4/1996 | Gadot et al. ................ 375/233 |
| 5,519,703 A | 5/1996 | Chauffour et al. ............ 370/84 |
| 5,528,625 A | 6/1996 | Ayanoglu et al. ........... 375/222 |
| 5,528,679 A | 6/1996 | Taarud ........................ 379/34 |
| 5,533,048 A | 7/1996 | Dolan ........................ 375/222 |
| 5,534,913 A | 7/1996 | Majeti et al. .................. 348/7 |
| 5,546,395 A | 8/1996 | Sharma et al. ................. 370/84 |
| 5,563,908 A | 10/1996 | Kaku et al. .................. 375/222 |
| 5,566,211 A | 10/1996 | Choi .......................... 375/332 |
| 5,598,401 A | 1/1997 | Blackwell et al. ............ 379/94 |
| 5,625,643 A | 4/1997 | Kaku et al. .................. 375/222 |
| 5,634,022 A | 5/1997 | Crouse et al. ............... 395/704 |
| 5,640,387 A | 6/1997 | Takahashi et al. .......... 370/359 |
| 5,646,958 A | 7/1997 | Tsujimoto ................... 375/233 |
| 5,671,250 A | 9/1997 | Bremer et al. ............... 375/222 |
| 5,694,420 A | 12/1997 | Ohki et al. .................. 375/222 |
| 5,710,792 A | 1/1998 | Fukawa et al. .............. 375/229 |
| 5,724,393 A | 3/1998 | Dagdeviren ................. 375/296 |
| 5,726,765 A | 3/1998 | Yoshida et al. .............. 358/412 |
| 5,729,226 A | 3/1998 | Betts et al. .................... 341/94 |
| 5,732,104 A | 3/1998 | Brown et al. ............... 375/222 |
| 5,734,663 A | 3/1998 | Eggenberger ............... 371/39.1 |
| 5,751,717 A | 5/1998 | Babu et al. .................. 370/466 |
| 5,751,796 A | 5/1998 | Scott et al. ............... 379/93.31 |
| 5,754,594 A | 5/1998 | Betts et al. .................. 375/285 |
| 5,757,849 A | 5/1998 | Gelblum et al. ............. 375/222 |
| 5,757,865 A | 5/1998 | Kaku et al. .................. 375/344 |
| 5,761,247 A | 6/1998 | Betts et al. .................. 375/316 |
| 5,768,311 A | 6/1998 | Betts et al. .................. 375/222 |
| 5,778,024 A | 7/1998 | McDonough ............... 375/216 |
| 5,784,377 A | 7/1998 | Baydar et al. ............... 370/463 |
| 5,784,405 A | 7/1998 | Betts et al. .................. 375/222 |
| 5,784,415 A | 7/1998 | Chevillat et al. ............ 375/341 |
| 5,793,809 A | 8/1998 | Holmquist ................... 375/242 |
| 5,796,808 A | 8/1998 | Scott et al. ............... 379/93.31 |
| 5,801,695 A | 9/1998 | Townshend ................. 375/340 |
| 5,805,669 A | 9/1998 | Bingel et al. ................. 379/28 |
| 5,809,075 A | 9/1998 | Townshend ................. 375/254 |
| 5,812,537 A | 9/1998 | Betts et al. .................. 370/286 |
| 5,815,534 A | 9/1998 | Glass ......................... 375/326 |
| 5,822,371 A | 10/1998 | Goldstein et al. ........... 375/242 |
| 5,825,816 A | 10/1998 | Cole et al. .................. 375/222 |
| 5,825,823 A | 10/1998 | Goldstein et al. ........... 375/286 |
| 5,831,561 A | 11/1998 | Cai et al. ..................... 341/106 |
| 5,835,532 A | 11/1998 | Strolle et al. ............... 375/233 |
| 5,835,538 A | 11/1998 | Townshend ................. 375/295 |
| 5,838,724 A | 11/1998 | Cole et al. .................. 375/222 |
| 5,839,053 A | 11/1998 | Bosch et al. ................ 455/13.1 |
| 5,844,940 A | 12/1998 | Goodson et al. ............. 375/222 |
| 5,850,388 A | 12/1998 | Anderson et al. ........... 370/252 |
| 5,850,421 A | 12/1998 | Misra et al. ................. 375/354 |
| 5,852,631 A | 12/1998 | Scott ........................... 375/222 |
| 5,862,141 A | 1/1999 | Trotter ....................... 370/468 |
| 5,862,179 A | 1/1999 | Goldstein et al. ........... 375/242 |
| 5,862,184 A | 1/1999 | Goldstein et al. ........... 375/295 |
| 5,870,429 A | 2/1999 | Moran, III et al. ......... 375/222 |
| 5,872,817 A | 2/1999 | Wei ........................... 375/341 |
| 5,881,066 A | 3/1999 | Lepitre ...................... 371/20.5 |
| 5,881,102 A | 3/1999 | Samson ...................... 375/222 |
| 5,887,027 A | 3/1999 | Cohen et al. ............... 375/222 |
| 5,911,115 A | 6/1999 | Nair et al. ..................... 455/63 |
| 5,914,982 A | 6/1999 | Bjarnason et al. ........... 375/222 |
| 5,918,204 A | 6/1999 | Tsurumaru .................. 704/214 |
| 5,926,506 A | 7/1999 | Berthold et al. ............. 375/222 |
| 6,023,493 A * | 2/2000 | Olafsson ..................... 375/354 |
| 6,201,842 B1 * | 3/2001 | Kim .......................... 375/346 |
| 6,301,296 B1 * | 10/2001 | Krishnan et al. ............ 375/222 |
| 6,366,591 B1 * | 4/2002 | Lai ............................. 370/523 |
| 6,370,124 B1 * | 4/2002 | Lai ............................. 370/292 |
| 6,553,074 B1 * | 4/2003 | Shaw et al. ................. 375/242 |
| 6,611,563 B1 * | 8/2003 | Davis et al. ................. 375/242 |
| 6,643,270 B1 * | 11/2003 | Demjanenko et al. ....... 370/282 |
| 6,650,657 B1 * | 11/2003 | Abdelilah et al. ........... 370/474 |
| 6,661,847 B1 * | 12/2003 | Davis et al. ................. 375/242 |
| 6,754,258 B1 * | 6/2004 | Abdelilah et al. ........... 375/220 |

OTHER PUBLICATIONS

Gardner, Interpolation in Digital Modems—Part 1: Fundamentals, *IEEE Transactions on Communications,* vol. 41, No. 3, pp. 501–507 (Mar. 1995).

Humblet et al., The Information Driveway, *IEEE Communications Magazine,* pp. 64–68 (Dec. 1996).

Kalet et al., The Capacity of PCM Voiceband Channels, *IEEE International Conference on Communications '93,* pp. 507–511 (Geneva, Switzerland, May 23–26, 1993).

Mueller et al., Timing Recovery in Digital Synchronas Data Receiver, *IEEE Transactions on Communications,* vol. Com–24, No. 5, pp. 516–531 (May 1976).

Okubo et al., Building Block Design of Large Capacity PCM–TDMA Subscriber System and Direct Digital Interface on Digital Exchange, Japan Radio Co., Ltd., pp. 69–73 (Japan).

Pahlavan et al., Nonlinear Quantization and the Design of Coded and Uncoded Signal Constellations, *IEEE Transactions on Communications,* vol. 39, No. 8, pp. 1207–1215 (Aug. 1991).

Proakis, Digital Signaling Over a Channel with Intersymbol Interference, *Digital Communications,* pp. 373, 381 (McGraw–Hill Book Company, 1983).

Williams et al., Counteracting the Quantisation Noise from PCM Codecs, BT Laboratories, pp. 24–29 (UK).

A Digital Modem and Analog Modem Pair for Use on the Public Switched Telephone Network (PSTN) at Data Signalling Rates of Up to 56 000 Bit/s Downstream and 33 600 Bit/s Upstream, *ITU–T V.90* (Sep. 1998).

Series V: Data Communication Over the Telephone Network; Interfaces and voiceband modems; A modem operating at data signalling rates of up to 33 600 bit/s for use on the general switched telephone network and on leased point–to–point 2–wire telephone type circuits, *ITU–T V.34* (10/96).

Bell, R.A., et al., Automatic Speed Reduction and Switched Network Back–up, *IBM Technical Disclosure Bulletin,* vol. 32, No. 1, pp. 154–157 (Jun. 1989).

Abbiate, J.C., et al., Variable–Data Transmission Modem, *IBM Technical Disclosure Bulletin,* vol. 17, No. 11, pp. 3301–3302 (Apr. 1975).

Data Communication Over the Telephone Network; Procedures for Starting Sessions of Data Transmission Over the General Switched Telephone Network, *ITU–T V.8* (09/94).

Line Quality Monitoring Method, *IBM Technical Disclosure Bulletin,* vol. 18, No. 8, pp. 2726–2726 (Jan. 1976).

Loopback Tests for V.54 Data Communications Equipment, *IBM Technical Disclosure Bulletin,* vol. 32, No. 3A, pp. 295–299 (Aug. 1989).

On–Line Real Time Modem Testing, *IBM Technical Disclosure Bulletin,* vol. 20, No. 6, pp. 2252–2254 (Nov. 1977).

Pierobon, Gianfranco L., Codes of Zero Spectral Density at Zero Frequency, *IEEE Transactions on Information Theory,* vol. IT–30, No. 2, pp. 453–459 (Mar. 1984).

Marcus, Brian H., et al., On Codes with Spectral Nulls at Rational Submultiples of the Symbol Frequency, *IEEE Transactions on Information Theory,* vol. IT–33, No. 4, pp. 557–568 (Jul. 1987).

Fischer, Robert, et al., Signal Mapping for PCM Modems, *ITU–Telecommunications Standardization Section PCM '97–120, V.pcm Rapporteur Meeting,* (Sunriver, Oregon; Sep. 4–12, 1997).

Pulse Code Modulation (PCM) of Voice Frequencies, *ITU–T,* Recommendation G.711 (Geneva, 1972).

Series G: Digital Transmission Systems; Terminal equipments—Coding of analogue signals by pulse code modulation; Pulse code modulation (PCM) of voice frequencies, *ITU–T,* Recommendation G.711 (Geneva, 1996).

Data Communications Over the Telephone Network; Error–Correcting Procedures for DCEs Using Asynchronous–to–Synchronous Conversion, *ITU–T V.42,* (03/93).

Improvement to Spectral Shaping Technique, *Research Disclosure,* V. 41, n415,415111, pp. 1550–1551 (Nov. 1998).

TIA Standard Draft: North American Telephone Network Transmission Model for Evaluating Analog Client to Digitally Connected Server Modems, Telecommunications Industry Association, PN3857,Draft 10 (Feb. 1999).

Davis, Gordon T., DSP and MATLAB implementation of model–based constellation generation (Sep. 18, 1998).

Woodruff, K.R., et al., *Automatic and Adaptive System and Efficient Communication in Noisy Communication Line Environment,* IBM Technical Disclosure Bulletin, vol. 24, No. 9, pp. 4627–4629 (Feb. 1982).

Godard, D., et al., Decision Feedback Equalizer Stabilization in Adaptive Mode, *IBM Technical Disclosure Bulletin,* vol. 24, No. 11A, pp. 5691–5692 (Apr. 1982).

Borgnis–Desbordes, P., et al., Variable–Speed Data Transmission, *IBM Technical Disclosure Bulletin,* vol. 27, No. 4A, pp. 2269–2270 (Sep. 1984).

Couland, G., et al., Analog Wrap Self–Test in Modems During Retrain Operations, *IBM Technical Disclosure Bulletin,* vol. 28, No. 6, p. 2457 (Nov. 1985).

Maddens, F., Sixteen–State Forward Convolutional Encoder, *IBM Technical Disclosure Bulletin,* vol. 28, No. 6, pp. 2466–2468 (Nov. 1985).

Remote Modem–Type Self–Learning, *IBM Technical Disclosure Bulletin,* vol. 28, No. 6, pp. 2398–2399 (Nov. 1985).

Maddens, F., Sixteen–State Feedback Convolutional Encoder, *IBM Technical Disclosure Bulletin,* vol. 28, No. 10, pp. 4212–4213 (Mar. 1986).

Bell, R. A., et al., *Automatic Speed Reduction and Switched Network Back–up,* IBM Technical Disclosure Bulletin, vol. 32, No. 1, pp. 154–157 (Jun. 1989).

Nobakht, R.A., Trellis–Coded Modulation Coding Scheme for a 19/2 Kbps Modem, *IBM Technical Disclosure Bulletin,* vol. 36, No. 11, pp. 167–170 (Nov. 1993).

Nobakht, R.A., Unified Table Based Subset Decoder for the Viterbi Algorithm, *IBM Technical Disclosure Bulletin,* vol. 37, No. 09, pp. 581–587 (Sep. 1994).

Nobakht, R.A., Trellis Subset Decoder Algorithm Based on a Pattern Recognition Scheme, *IBM Technical Disclosure Bulletin,* vol. 37, No. 10, pp. 693–697 (Oct. 1994).

Abbiate, J.C., et al., Variable–Data Transmission Modem, *IBM Technical Disclosure Bulletin,* vol. 17, No. 11, pp. 3301–3302 (Apr. 1975).

Barlet, J., et al., Full Speed Recovery in High Speed Modems, *IBM Technical Disclosure Bulletin,* vol. 23, No. 2, pp. 641–643 (Jul. 1980).

Dialog Abstract, Sample rate converter for duplex modem, European Patent No. 285413.

Dialog Abstract, Two–speed full–duplex modem for telephone network, PCT No. WO 8501407.

Dialog Abstract, Digital data transmission system, European Patent No. 124764.

Dialog Abstract, Facsimile communication controller, Japanese Publication No. 04–175060 (Jun. 23, 1992).

Dialog Abstract, Picture communication equipment, Japanese Patent Publication No. 03–120954 (May 23, 1991).

Dialog Abstract, Radio date transmission system, Japanese Publication No. 01–179535 (Jul. 17, 1989).

Dialog Abstract, Facsimile device, Japanese Publication No. 57–164654 (Oct. 9, 1982).

Dialog Abstract, Data repeater, Japanese Publication No. 57–087255 (May 31, 1982).

Dialog Abstract, Blinding training method for decision feedback equaliser having feed–forward feedback filters, European Patent No. 880253.

Dialog Abstract, Processing method for distorted signal received by qam receiver, European Patent No. 465851.

Dialog Abstract, Establishing wireless communication channel, PCT. No. WO 9905820.

Dialog Abstract, High–speed rate adaptive subscriber line digital data modem, PCT No. WO9830001.

Dialog Abstract, Digital modem in digital modulation system, Japanese Patent No. 8116341.

Dialog Abstract, Communication equipment and radio communication adapter, Japanese Publication No. 08–340289 (Dec. 24, 1996).

Dialog Abstract, Data recording method, Japanese Publication No. 05–089597 (Apr. 9, 1993).

Dialog Abstract, Transmission control system for data communication and its modem equipment, Japanese Publication No. 02–228853 (Sep. 11, 1990).

Naguib, A.F. et al., Dialog Abstract, A space–time coding modem for high–data–rate wireless communications, *IEEE Journal of Selected Areas in Communications,* vol. 16, No. 8, pp. 1459–1478 (Oct. 1998).

Denno, S., et al., Dialog Abstract, Mbit/s burst modem with an adaptive equalizer for TDMA mobile radio communications, *IEICE Transactions on Communications,* vol. E81–B, No. 7, pp. 1453–1461 (Jul. 1998).

Naguib, A.F., et al., Dialog Abstract, A space–time coding modem for high–data–rate wireless communications, *GlobeCom 97, IEEE Global Telecommunications Conference,* vol. 1, pp. 102–109 (1997).

Kobayashi, K., et al., Dialog Abstract, Fully digital burst modem for satellite multimedia communication systems, *IEICE Transactions on Communications,* vol. E80–B, No. 1, pp. 8–15 (Jan. 1997).

Skellern, D.J., et al., Dialog Abstract, A high speed wireless LAN, *IEEE Micro,* vol. 17, No. 1, pp. 40–47 (Jan.–Feb. 1997).

Enomoto, K., et al., Dialog Abstract, A mode switching type burst demodulator AFC, *Transactions of the Institute of Electronics, Information and Communication Engineers,* vol. J76B–II, No. 5, pp. 415–421 (May 1993).

Betts, W., Dialog Abstract, Nonlinear encoding by surface projection, *International Conference on Data Transmission—Advances in Modern and ISDN Technology and Applications* (Sep. 23–25, 1992).

Schilling, D.L., et al., Dialog Abstract, The FAVR meteor burst communication experiment, *Military Communications in a Changing World MilCom '91* (Nov. 4–7, 1991).

Jacobsmeyer, J.M., Dialog Abstract, Adaptive trellis–coded modulation for bandlimited meteor burst channels, *IEEE Journal on Selected Areas in Communications,* vol. 10, No. 3, pp. 550–561 (Apr. 1992).

Sato, T., et al., Dialog Abstract, Protocol configuration and verification of an adaptive error control scheme over analog cellular networks, *IEEE Transactions on Vehicular Technology,* vol. 41, No. 1, pp. 69–76 (Feb. 1992).

Lee, L.–N., et al., Dialog Abstract, Digital signal processor–band programmable BPSK/QPSK/offset–QPSK modems, *COMSAT Technical Review,* pp. 195–234 (Fall 1989).

Sato, T., et al., Dialog Abstract, Error–free high–speed data modem, *Oki Technical Review,* vol. 56, No. 133, pp. 20–26, (Apr. 1989).

Seo, J.–S., et al., Dialog Abstract, Performance of convolutional coded SQAM in hardlimited satellite channels, *IEEE International Conference on Communications BostonICC/89,* vol. 2, pp. 787–791 (Jun. 11–14, 1989).

Murakama, K., et al., Dialog Abstract, FEC combined burst–modem for business satellite communications use, *IEEE/IECE Global Telecommunications Conference 1987,* vol. 1, pp. 274–280 (Japan, Nov. 15–18, 1987).

McVerry, F., Dialog Abstract, Performance of a fast carrier recovery scheme for burst–format DQPSK transmission over satellite channels, *International Conference on Digital Processing of Signals in Communications,* pp. 165–172 (United Kingdom, 1985).

Filter, J.H.J., Dialog Abstract, An algorithm for detecting loss of synchronisation in data transmission sets (modems), *Transactions of the South African Institute of Electrical Engineers,* vol. 76, No. 1, pp. 39–43 (Jan. 1985).

Gersho, A., Dialog Abstract, Reduced complexity implementation of passband adaptive equlizers, *IEEE Journal on Selected Areas in Communications,* vol. SAC–2, No. 5, pp. 778–779 (Sep. 1984).

Dialog Abstract, High–speed full–duplex modem reduces telephone connect time, *EDN,* vol. 27, No. 18, p. 77 (Sep. 15, 1982).

Chadwick, H., et al., Dialog Abstract, Performance of a TDMA burst modem through a dual nonlinear satellite channel, *Fifth International Conference on Digital Satellite Communications,* pp. 63–67 (Italy, Mar. 23–26, 1981).

Nussbaumer, H., Dialog Abstract, Reducing the acquisition time in an automatic equalizer, *IBM Technical Disclosure Bulletin,* vol. 18, No. 5, pp. 1465–1479 (Oct. 1975).

Uzunoglu, V., et al., Dialog Abstract, Synchronous and the coherent phase–locked synchronous oscillators: new techniques in synchronization and tracking, *IEEE Transactions on Circuits and Systems,* vol. 36, No. 7, pp. 997–1004 (Jul. 1989).

Minei, I., et al., Dialog Abstract, High–speed Internet access through unidirectional geostationary satellite channels, *IEEE Journal on Selected Areas in Communications,* vol. 17, No. 2, pp. 345–359 (Feb. 1999).

Ovadia, S., Dialog Abstract, The effect of interleaver depth and QAM channel frequency offset on the performance of multichannel AM–VSB/256–QAM video lightwave transmission systems, *International Conference on Telecommunications: Bridging East and West Through Communications,* vol. 1, pp. 339–343 (Greece, Jun. 21–25, 1998).

Johnson, R.W., et al., Dialog Abstract, Error correction coding for serial–tone HG transmission, *Seventh International Conference on HF Radio Systems and Techniques,* pp. 80–84 (United Kingdom, Jul. 7–10, 1997).

Karasawa, Y., et al., Dialog Abstract, Cycle slip in clock recovery on frequency–selective fading channels, *IEEE Transactions on Communications,* vol. 45, No. 3, pp. 376–383 (Mar. 1997).

Umehira, M., et al., Dialog Abstract, Design and performance of burst carrier recovery using a phase compensated filter, *Transactions of the Institute of Electronics, Information and Communication Engineers,* vol. J78B–II, No. 12, pp. 735–746 (Dec. 1995).

De Bot, P., et al., Dialog Abstract, An example of a multi–resolution digital terrestrial TV modem, *Proceedings of ICC '93—IEEE International Conference on Communications,* vol. 3, pp. 1785–1790 (Switzerland, May 23–26, 1993).

Lei, Chen, et al., Dialog Abstract, Single–tone HF high speed data modem, *Proceedings of TENCON '93—IEEE Region 10 International Conference on Computers, Communications and Automation,* vol. 3, pp. 94–98 (China, Oct. 19–21, 1993).

Woerner, B.D., et al., Dialog Abstract, Simulation issues for future wireless modems, *IEEE Communications,* vol. 32, No. 7, pp. 42–53 (Jul. 1994).

Sato, T., et al., Dialog Abstract, Vehicle terminal equipment with dedicated DSP, *Oki Technical Review,* vol. 58, No. 144, pp. 49–52 (Jul. 1992).

Sato, T., et al., Dialog Abstract, *Protocol configuration and verification of an adaptive error control scheme over analog cellular networks, IEEE Transactions on Vehicular Technology,* vol. 41, No. 1, pp. 69–76 (Feb. 1992).

Tamm, Yu.A., Dialog Abstract, The effect of suppressing harmonic interference using an adaptive equalizer, *Elektrosvyaz,* vol. 45, No. 3, pp. 5–10 (Mar. 1990).

Saleh, A.A.M., et al., Dialog Abstract, An experimental TDMA indoor radio communications systemusing slow frequency hopping and coding, *IEEE Transactions on Communications,* vol. 39, No. 1, pp. 152–162 (Jan., 1991).

Nergis, A., Dialog Abstract, Optimum HF digital communication systems with block coding and interleaving techniques, *Proceedings of the 1990 Bilkent International Conference on New Trends in Communications, Control and Signal Processing,* vol. 1, pp. 511–517 (Turkey, Jul. 2–5, 1990).

Kawamata, F., et al., Dialog Abstract, An evaluation of voice codecs and facsimiles, *Review of the Communications Research Laboratory,* vol. 36, pp. 69–73 (Mar. 1990).

Sato, T., et al., Dialog Abstract, *Error–free high–speed data transmission protocol simultaneously applicable to both wire and mobile radio channels, 38th Vehicular Technology Conference: 'Telecommunication Freedom—Technology on the Move',* pp. 489–496 (Jun. 15–17, 1988).

Dialog Abstract, 1200–bit/s cellular modem DLD03H, *Oki Technical Review,* vol. 53, No. 127, pp. 70–72 (Jul. 1987).

Chamberlin, J.W., et al., Dialog Abstract, Design and field test of a 256–QAM DIV modem, *IEEE Journal on Selected Areas in Communications,* vol. SAC–5, No. 3, pp. 349–356 (Apr. 1987).

De Cristafaro, R., et al., Dialog Abstract, A 120 Bv/s QPSK modem designed for the INTELSAT TDMA network, *International Journal of Satellite Communications,* vol. 3, Nos, 1–2, pp. 145–160 (Jan.–Jun., 1985).

Shumate, A., Dialog Abstract, Error correction coding for channels subject to occasional losses of bit count integrity, *IEEE Military Communications Conference,* vol. 1, pp. 89–83 (Oct. 21–24, 1984).

Suyderhoud, H., et al., Dialog Abstract, Investigation of 9.6 kb/s data transmission via a PCM link at 64 kb/s with and without link errors, *International Journal of Satellite Communications,* vol. 2, No. 1, pp. 81–87 (Jan.–Mar., 1984).

Smith, C., Dialog Abstract, Relating the performance of speech processors to the bit error rate, *Speech Technology,* vol. 2, No. 1, pp. 41–53 (Sep.–Oct. 1983).

Suyerhoud, H., et al., Dialog Abstract, Investigation of 9.6–kbit/s data transmission via a PCM link at 64 kbit/s with and without link errors, *Sixth International Conference on Digital Satellite Communications Proceedings,* pp. 26–33 (Sep. 19, 23, 1983).

Kittel, L., Dialog Abstract, Analogue and discrete channel models for signal transmission in mobile radio, *Frequenz,,* vol. 36, Nos. 4–5, pp. 153–160 (Apr.–May 1982).

Farrell, P.G., et al., Dialog Abstract, Soft–decision error control of h.f. data transmission, *IEE Proceedings F (Communications, Radar and Signal Processing),* vol. 127, No. 5, pp. 389–400 (Oct. 1980).

Johnson, A.L., Dialog Abstract, Simulation and implementation of a modulation system for overcoming ionospheric scintillation fading, *AGARD Conference Proceedings No. 173 on Radio Systems and the Ionosphere,* pp. 3/1–5 (Greece, May 26–30, 1975).

Matsumura, K., et al., Dialog Abstract, Anti–interference data–transmission set of HF radio equipment, *Mitsubishi Electric Engineer,* No. 41, pp. 18–23 (Sep., 1974).

Blank, H.A., et al., Dialog Abstract, A Markov error channel model, *1973 International Telecommunications Conference,* vol. 1, pp. 15B/1–8 (Nov. 26–28, 1973).

McGruther, W.G., Dialog Abstract, Long term error performance data for operation at 2400 bps ona nonswitched private line network, *Summaries of papers presented at 1970 Canadian symposium on communications,* pp. 65–66 (Canada, Nov. 12–13, 1970).

Burton, H.O., et al., Dialog Abstract, On the use of error statistics from data transmission on telephone facilities to estimate performance of forward–error–correction, *1970 international conference on communications,* p. 21 (Jun. 8–10, 1970).

Bowen, R.R., Dialog Abstract, Application on burst error correction codes to data modems for dispersive channels, *Proceedings of the 1970 international symposium on information theory,* p. 1 (Netherlands, Jun. 15–19, 1970).

Pierce, A.W., et al., Dialog Abstract, Effective application of forward–acting error–control coding to multichannel h.f. data modems, *IEEE Transactions on Communication Technology,* vol. Com–18, No. 4, pp. 281–294 (Aug. 1970).

West, R.L., Abstract, Data Concentration Method, *IBM Technical Disclosure Bulletin,* pp. 487–489; http://w3.infogate.ibm.com:1207/SESS506884/GETDOC/39/2/1 (Jul., 1975).

Haas, L.C., et al., Abstract, Received Line Signal Quality Analysis, *IBM Technical Disclosure Bulletin,* pp. 5414–5416; http://w3.infogate.ibm.com:1207/SESS5068-84/GETDOC/43/1/1 (May, 1981).

Nussbaumer, H., Abstract, Reducing the Acquisition Time in an Automatic Equalizer, *IBM Technical Disclosure Bulletin,* pp. 1465–1479; http://w3.infogate.ibm.com:1207/SESS50-6884/GETDOC/40/2/1 (Oct. 1975).

Dialog Abstract, Listener echo canceller for digital communication system, PCT No. WO 9310607.

Dialog Abstract, Reduced time remote access method for modem computer, PCT. No. WO 9209165.

* cited by examiner

SYSTEM, METHODS AND COMPUTER PROGRAM PRODUCTS FOR IDENTIFYING DIGITAL IMPAIRMENTS IN MODEM SIGNALS USING SIGNATURE ANALYSIS AND SIGNAL LEVEL COMPARISON ANALYSIS

FIELD OF THE INVENTION

This invention relates to modems, and more particularly to startup signals and sequences for digital modems.

BACKGROUND OF THE INVENTION

The demand for remote access to information sources and data retrieval, as evidenced by the success of services such as the World Wide Web, is a driving force for high-speed network access technologies. Today's telephone network offers standard voice services over a 4 kHz bandwidth. Traditional analog modem standards generally assume that both ends of a modem communication session have an analog connection to the Public Switched Telephone Network (PSTN). Because data signals are typically converted from digital to analog when transmitted towards the PSTN and then from analog to digital when received from the PSTN, data rates may be limited to 33.6 kbps as defined in the V.34 transmission recommendation developed by the International Telecommunications Union (ITU).

The need for an analog modem can be eliminated, however, by using the Basic Rate Interface (BRI) of the Integrated Services Digital Network (ISDN). A BRI offers end-to-end digital connectivity at an aggregate data rate of 160 kbps, which is comprised of two 64 kbps B channels, a 16 kbps D channel, and a separate maintenance channel. ISDN can offer comfortable data rates for Internet access, telecommuting, remote education services, and some forms of video conferencing. ISDN deployment, however, has been very slow due at least in part to the substantial investment for new equipment. Because ISDN presently is not very pervasive in the PSTN, the network providers have typically tarriffed ISDN services at relatively high rates, which may be ultimately passed on to the ISDN subscribers. In addition to the high service costs, subscribers must generally purchase or lease network termination equipment to access the ISDN.

While most subscribers do not enjoy end-to-end digital connectivity through the PSTN, the PSTN is nevertheless mostly digital. Typically, the only analog portion of the PSTN is the phone line or local loop that connects a subscriber or client modem (e.g., an individual subscriber in a home, office, or hotel) to the telephone company's Central Office (CO). In recent years, local telephone companies have been replacing portions of their original analog networks with digital switching equipment. Nevertheless, the connection between the home and the CO generally has been the slowest to change to digital as discussed in the foregoing with respect to ISDN BRI service.

A recent data transmission recommendation issued by the ITU, known as V.90, takes advantage of the digital conversions that have been made in the PSTN. By viewing the PSTN as a digital network, V.90 technology is able to accelerate data downstream from the Internet or other information source to a subscriber's computer at data rates of up to 56 kbps, even when the subscriber is connected to the PSTN via an analog local loop.

To understand how the V.90 recommendation achieves this higher data rate, it may be helpful to briefly review the operation of V.34 analog modems. V.34 modems are optimized for the situation where both ends of a communication session are connected to the PSTN by analog lines. Even though most of the PSTN is digital, V.34 modems treat the network as if it were entirely analog. Moreover, the V.34 recommendation assumes that both ends of the communication session suffer impairment due to quantization noise introduced by analog-to-digital converters. That is, the analog signals transmitted from the V.34 modems are sampled at 8000 times per second by a codec upon reaching the PSTN, with each sample being represented or quantized by an eight-bit pulse code modulation (PCM) codeword. The codec uses 256, non-uniformly spaced, PCM quantization levels defined according to either the $\mu$-law or A-law companding standard (i.e. the ITU G.711 Recommendation).

Because the analog waveforms are continuous and the binary PCM codewords are discrete, the digits that are sent across the PSTN can only approximate the original analog waveform. The difference between the original analog waveform and the reconstructed quantized waveform is called quantization noise, which can limit the modem data rate.

While quantization noise may limit a V.34 communication session to 33.6 kbps, it nevertheless affects only analog-to-digital conversions. The V.90 standard relies on the lack of analog-to-digital conversions in the downstream path, outside of the conversion made at the subscriber's modem, to enable transmission at 56 kbps.

The general environment for which the V.90 standard was developed is depicted in FIG. 1. An Internet Service Provider (ISP) 22 is connected to a subscriber's computer 24 via a V.90 digital server modem 26, through the PSTN 28 via digital trunks (e.g., T1, E1 and/or ISDN Primary Rate Interface (PRI) connections), through a central office switch 32, and finally through an analog loop to the client modem 34. The central office switch 32 is drawn outside of the PSTN 28 to better illustrate the connection of the subscriber's computer 24 and modem 34 into the PSTN 28. It should be understood that the central office 32 generally is, in fact, a part of the PSTN 28. Operation of a communication session between the subscriber 24 and an ISP 22 is best described with reference to the more detailed block diagram of FIG. 2.

Referring to FIG. 2, transmission from the server modem 26 to the client modem 34 will be described first. The information to be transmitted is first encoded using only the 256 PCM codewords used by the digital switching and transmission equipment in the PSTN 28. These PCM codewords are transmitted towards the PSTN by the PCM transmitter 36 where they are received by a network codec.

The PCM data is then transmitted through the PSTN 28 until reaching the central office 32 to which the client modem 34 is connected. Before transmitting the PCM data to the client modem 34, the data is converted from its current form as either $\mu$-law or A-law companded PCM codewords to Pulse Amplitude Modulated (PAM) voltages by the codec expander (digital-to-analog (D/A) converter) 38. These PAM voltage levels are processed by a central office hybrid 42 where the unidirectional signal received from the codec expander 38 is transmitted towards the client modem 34 as part of a bidirectional signal. A second hybrid 44 at the subscriber's analog telephone connection converts the bidirectional signal back into a pair of unidirectional signals.

Finally, the analog signal from the hybrid 44 is converted into digital PAM samples by an analog-to-digital (A/D) converter 46, which are received and decoded by the PAM receiver 48. Note that for transmission to succeed effectively at 56 kbps, there should be only a single digital-to-analog conversion and subsequent analog-to-digital conversion between the server modem 26 and the client modem 34. Recall that analog-to-digital conversions in the PSTN 28 can introduce quantization noise, which may limit the data rate as discussed hereinbefore. The A/D converter 46 at the client modem 34, however, may have a higher resolution than the A/D converters used in the analog portion of the PSTN 28 (e.g. 16 bits versus 8 bits), which results in less quantization noise. Moreover, the PAM receiver 48 preferably is in synchronization with the 8 kHz network clock to properly decode the digital PAM samples.

Transmission from the client modem 34 to the server modem 26 follows the V.34 data transmission standard. That is, the client modem 34 includes a V.34 transmitter 52 and a D/A converter 54 that encode and modulate the digital data to be sent using techniques such as Quadrature Amplitude Modulation (QAM). The hybrid 44 converts the unidirectional signal from the digital-to-analog converter 54 into a bidirectional signal that is transmitted to the central office 32. Once the signal is received at the central office 32, the central office hybrid 42 converts the bidirectional signal into a unidirectional signal that is provided to the central office codec. This unidirectional, analog signal is converted into either $\mu$-law or A-law companded PCM codewords by the codec compressor (A/D converter) 56, which are then transmitted through the PSTN 28 until reaching the server modem 26. The server modem 26 includes a conventional V.34 receiver 58 for demodulating and decoding the data sent by the V.34 transmitter 52 in the client modem 34. Thus, data is transferred from the client modem 34 to the server modem 26 at data rates of up to 33.6 kbps as provided for in the V.34 standard.

Thus, the V.90 standard offers increased data rates (e.g., data rates up to 56 kbps) in the downstream direction from a server to a subscriber or client. Upstream communication still generally takes place at conventional data rates as provided for in the V.34 standard. Nevertheless, this asymmetry is particularly well suited for Internet access. For example, when accessing the Internet, high bandwidth generally is most useful when downloading large text, video, and audio files to a subscriber's computer. Using V.90, these data transfers can be made at up to 56 kbps. On the other hand, traffic flow from the subscriber to an ISP generally includes mainly keystroke and mouse commands, which are readily handled by the conventional rates provided by V.34.

As described above, the digital portion of the PSTN 28 transmits information using eight-bit PCM codewords at a frequency of 8000 Hz. Thus, it would appear that downstream transmission should take place at 64 kbps rather than 56 kbps as defined by the V.90 standard. While 64 kbps is a theoretical maximum, several factors may prevent actual transmission rates from reaching this ideal rate. First, even though the problem of quantization error can be substantially eliminated by using PCM encoding and PAM for transmission, additional noise in the network or at the subscriber premises, such as non-linear distortion and crosstalk, can limit the maximum data rate. Furthermore, the $\mu$-law or A-law companding techniques generally do not use uniform PAM voltage levels for defining the PCM codewords. The PCM codewords representing very low levels of sound have PAM voltage levels spaced close together. Noisy transmission facilities can prevent these PAM voltage levels from being distinguished from one another thereby causing loss of data. Accordingly, to provide greater separation between the PAM voltages used for transmission, not all of the 256 PCM codewords may be used.

It is generally known that, assuming a convolutional coding scheme, such as trellis coding, is not used, the number of symbols to transmit a certain data rate is given by Equation 1:

$$bps = R_s \log_2 N_s \qquad \text{EQ. 1}$$

where bps is the data rate in bits per second, $R_s$ is the symbol rate, and $N_s$ is the number of symbols in the signaling alphabet or constellation. To transmit at 56 kbps using a symbol rate of 8000, Equation 1 can be rewritten to solve for the number of symbols required as set forth below in Equation 2:

$$N_s = 2^{56000/8000} = 128 \qquad \text{EQ. 2}$$

Thus, the 128 most robust codewords of the 256 available PCM codewords generally are chosen for transmission as part of the V.90 standard.

Successful operation of a V.90 receiver may depend on an accurate identification of the reference PAM signaling levels that are often called the signaling alphabet or the signal constellation. The digital samples that are filtered by a decision feedback equalizer are provided to a slicer/detector where the samples are compared against the signaling alphabet. A determination is made with regard to which member of the alphabet or which point in the constellation the digital sample falls closest to. Once the alphabet member is identified, the PCM code word corresponding to that alphabet member is selected as the symbol transmitted for that digital sample.

While a set of ideal signaling levels can be defined for the signaling alphabet, the effective alphabet typically will deviate from these ideal levels because of underlying digital impairments resulting from Robbed Bit Signaling (RBS) and/or digital attenuation PADs. RBS is a mechanism utilized in the digital transport system, such as a T1 trunk, for signal control and status information between network equipment. PAD is similarly found in the digital transport system for the purpose of adjusting signal levels for different analog and digital equipment. Since these impairments will likely be chronic throughout the communication session, it may be more efficient for the modem to learn a new signaling alphabet that takes these impairments into account.

Accordingly, the V.90 standard specifies that during Phase 3 of the startup procedure that is carried out after establishing a dialed connection between the client and server modems, digital impairment learning will take place. During digital impairment learning, a plurality of sets of DIL signals, each corresponding to a set of PCM signals, is repeatedly transmitted from a server modem to a client modem during a corresponding plurality of DIL intervals, also referred to as framing intervals. For example, six DIL intervals may be provided during which all or a selected subset of the PCM levels for the constellation are transmitted. The plurality of DIL intervals may be repeated until the RBS and PAD digital impairments are identified. The PAD and RBS digital impairments so identified are then used in the Phase 4 final training procedures for the V.90 modem.

Unfortunately, the identification of RBS and PAD digital impairments may be difficult because of the many types of RBS and the many levels of PAD digital impairments that may be present in a telephone network. RBS and PAD identification also may be difficult due to the combinations of one or more PADs and/or RBS that may be present in a given network.

For example, RBS can manifest itself when the Least Significant Bit (LSB) of a PCM code word in a particular DIL interval is forced to a one. This operation has the effect of collapsing neighboring PCM code words with even and odd values into the odd value PCM code word. Other types of RBS variations are possible, and different DIL intervals may be subject to different types of RBS.

The effect of PADs generally is present in all six DIL intervals. A PAD also can result in multiple PCM code words collapsing into a single code word. Although this may not cause a problem for voice transmission, it may produce great difficulty for data transmission. PADs generally are not standardized and several quantization rules can be used for implementing a given PAD attenuation.

Accordingly, it is desirable to provide improved systems, methods and/or computer program products for identifying RBS and PAD digital impairments in the DIL signals that are repeatedly transmitted from a server modem to a client modem during a corresponding plurality of DIL intervals.

SUMMARY OF THE INVENTION

The present invention provides systems, methods and/or computer program products that can identify digital impairments including Robbed Bit Signaling (RBS) and Packet Assembler/Disassembler (PAD) impairments in a plurality of sets of Pulse Code Modulation (PCM) signal levels, such as a plurality of sets of Digital Impairment Learning (DIL) signals that are repeatedly transmitted from a server modem to a client modem during a corresponding plurality of DIL levels. The present invention uses both signature analysis and signal level comparison analysis for the set of PCM signals to identify digital impairments. By using both techniques in combination, the potential strengths of both techniques can be used while the potential weaknesses of both techniques can be reduced and preferably minimized. Efficient and robust identification of digital impairments thereby may be provided.

Signature analysis compresses the set of PCM signal levels into a signature. Digital impairments are determined based on the signature. In a preferred embodiment, the PCM signal levels are compressed into a signature by identifying clusters and/or skips in the set of PCM signal levels. A digital impairment in the set of PCM signal levels is determined based on the clusters and/or skips so identified.

More specifically, clusters and/or skips in the set of PCM signal levels that are received at the client modem from the server modem are counted. The digital impairment then may be determined based on the counts of the clusters and/or skips. Models of cluster and/or skip counts for a plurality of digital impairment scenarios may be obtained. The clusters and/or skips that are counted in the set of PCM signal levels that are received at the client modem are compared to the models of cluster and/or skip counts for the plurality of digital impairment scenarios, preferably to identify a closest match. The models of cluster and/or skip counts may be obtained by computing cluster counts and/or skip counts for an ideal set of PCM signal levels that is subject to a digital impairment scenario and quantization.

PCM signal level comparison analysis uses differences, preferably sum of squares of differences, between PCM signals and models of PCM signals having various digital impairments. A model that matches the PCM signals is selected, to thereby identify the digital impairments. Preferably, the model that most closely matches the PCM signals is selected.

According to first embodiments of the present invention, a digital impairment in a set of PCM signal levels is identified by performing signature analysis of the set of PCM signal levels to identify a range of candidate digital impairments. PCM signal level comparison analysis then is performed for the set of PCM signals over the range of candidate digital impairments, to identify the digital impairment. Preferably, when the digital impairments include single PAD and tandem PAD digital impairments, PCM signal level comparison analysis is performed for the set of PCM signal levels for a plurality, and preferably all, of possible tandem PAD digital impairments, if the signature analysis identifies a tandem PAD digital impairment. The single or tandem PAD from the PCM signal level comparison analysis then is reported for further use.

According to second embodiments of the present invention, signature analysis is performed on the set of PCM signal levels, to identify a signature analysis candidate digital impairment. PCM signal level comparison analysis also is performed for the set of PCM signal levels to identify a level comparison candidate digital impairment. A determination is made as to whether at least one criterion, described in detail below, is met. The level comparison candidate digital impairment is identified as the digital impairment if the at least one criterion is met. Alternately, the signature analysis candidate digital impairment is identified as the digital impairment if the at least one criterion is not met.

The criteria that can be used in order to determine whether the signature analysis candidate impairment or the level comparison candidate impairment is used include at least one of the following criterion: a transcoding flag is set; an Alaw flag is set; signature analysis does not identify a signature analysis candidate RBS digital impairment; signature analysis does not identify a signature analysis candidate PAD digital impairment; the difference between the signature analysis and the level comparison exceeds a threshold; the level comparison candidate PAD digital impairment is 4.5 dB; and the signature analysis candidate digital impairment and the level comparison candidate digital impairment both include a non-RBS interval.

In performing signature analysis, a signature analysis of the set of PCM signal levels preferably is first performed to identify a range of signature analysis candidate digital impairments. The range of signature analysis candidate digital impairments then is post-processed to identify the signature analysis candidate digital impairment.

More specifically, signal analysis preferably accumulates cluster counts and/or skip counts of the PCM signal levels and compares the cluster counts and/or skip counts so accumulated to model cluster and/or skip counts to identify a range of signature analysis candidate digital measurements. Post-processing then may be performed to identify the signature analysis candidate digital impairment from the range of signature analysis candidate digital impairments.

In preferred embodiments, the post-processing identifies a signature analysis candidate PAD impairment as 0 dB if there are no accumulated cluster and skip counts. An average of tandem PAD digital impairments is identified as the signature analysis candidate PAD digital impairment if a signal PAD impairment is not identified. A midpoint of a single range of signature analysis PAD digital impairments is identified if the single range of signature analysis PAD digital impairments is present. A midpoint of a second range of signature analysis PAD digital impairments is identified if a first range and the second range of signature analysis PAD digital impairments and tandem PAD digital impairments are identified. A midpoint of a first range of signature PAD digital impairments is identified if the first range and the second range of signature analysis PAD digital impairments are present, tandem PAD digital impairments are not identified and the difference between the cluster counts and skip counts is less than two. Finally, a midpoint of a first, second or third range of signature analysis PAD digital impairments is identified based upon the difference between the cluster counts and the skip counts.

The present invention can take advantage of the strengths of both signature analysis and signal level comparison analysis, while reducing and preferably minimizing the weaknesses of both. In particular, signal level comparison analysis can yield results that differ significantly from an actual digital impairment value, if a model of the actual digital impairment is not present. However, signal level comparison analysis may be superior when a model of the actual digital impairment is present. If the models for the signal level comparison analysis are expanded to include every possible digital impairment, many models may be needed and processing speed may be slowed. Moreover, signal level comparison analysis preferably is used with a small search step to accurately detect digital impairments. Again, the small step size may use excessive processing power.

In sharp contrast, signature analysis may be relatively efficient because only signatures are being compared rather than the actual PCM signal levels. Signature analysis also may accurately find digital impairment that did not correspond exactly to the model signatures. In particular, signature analysis may be less sensitive to small variations in digital impairments and can produce a range of candidate digital impairment values. Unfortunately, signature analysis may be less accurate than signal level comparison analysis for digital impairments that correspond to the models. Accordingly, a combination of signature analysis and signal level comparison analysis can provide efficient and accurate digital impairment identification. It will be understood that the present invention may be provided as modem-related systems, methods and/or computer program products.

DETAILED DESCRIPTION OF PREFERRED EMBODIMENTS

Figure 1:
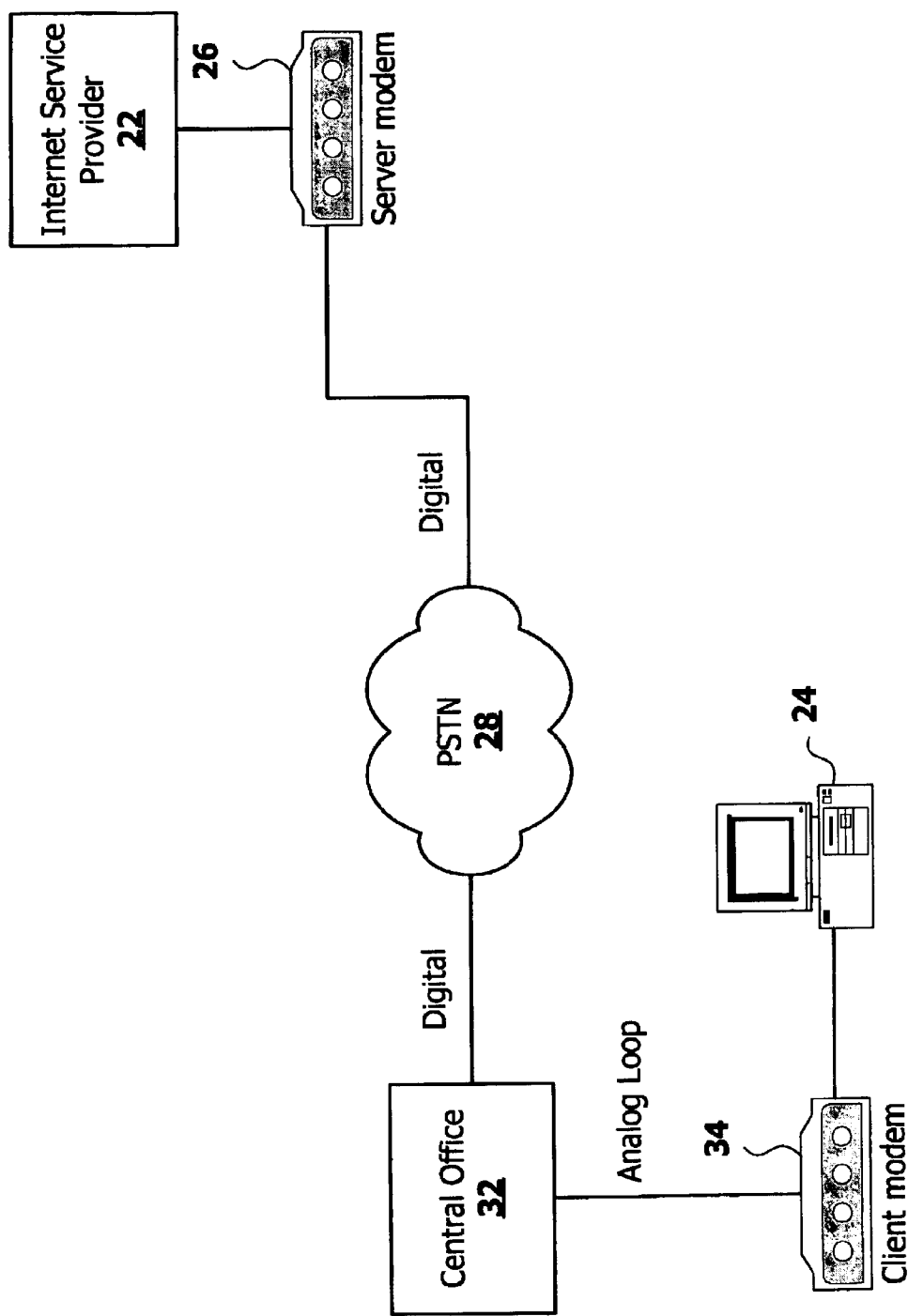
FIG. 1 is a block diagram of a conventional network using client and server modems.
Figure 2:
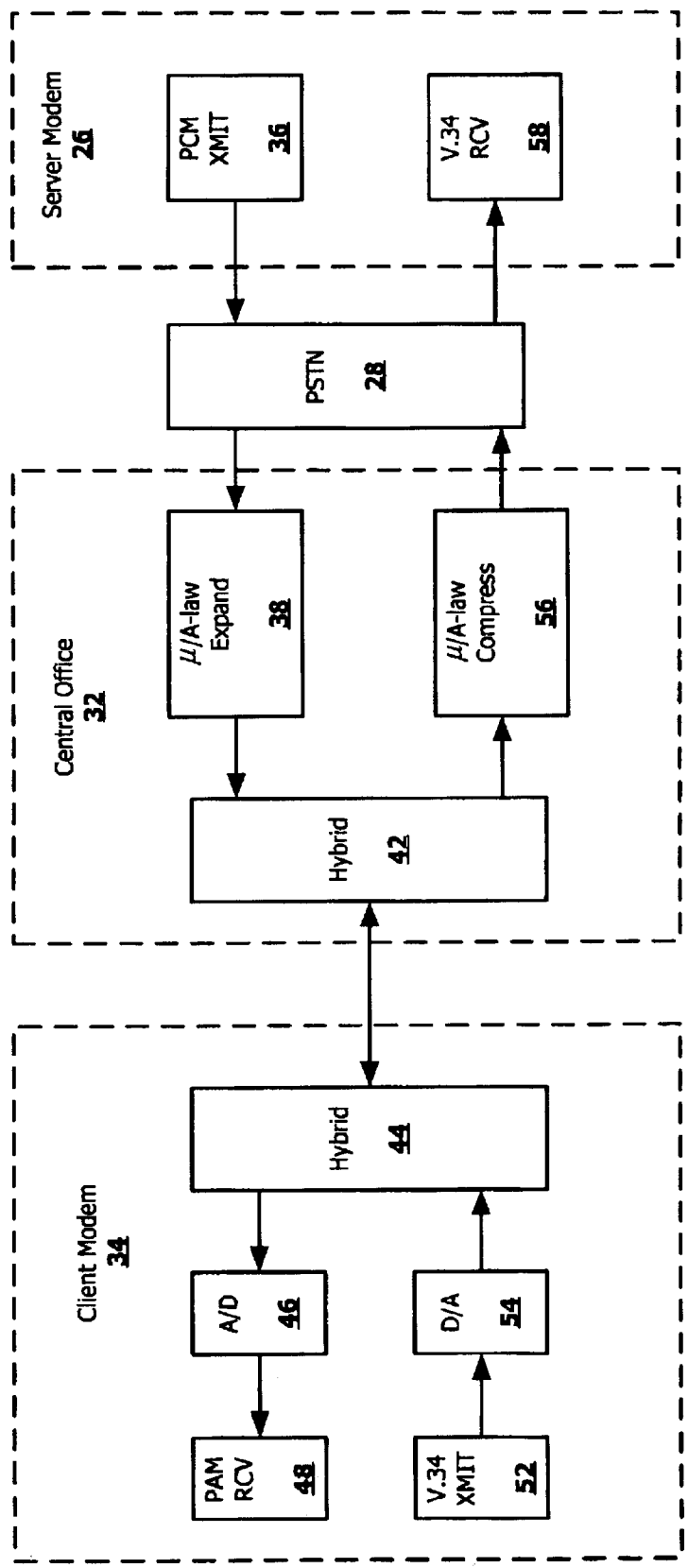
FIG. 2 is a more detailed block diagram of a network of FIG. 1.

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numbers signify like elements throughout the description of the figures.

As will be appreciated by those skilled in the art, the present invention can be embodied as a method, a digital signal processing system, and/or a computer program product. Accordingly, the present invention can take the form of an entirely hardware embodiment, an entirely software (including firmware, resident software, micro-code, etc.) embodiment, or an embodiment containing both software and hardware aspects. Furthermore, the present invention can take the form of a computer program product on a computer-usable or computer-readable storage medium having computer-usable program code embodied in the medium for use by or in connection with an instruction execution system. In the context of this document, a computer-usable or computer-readable medium can be any means that can contain, store, communicate, propagate, or transport the program for use by or in connection with the instruction execution system, apparatus, or device.

The computer-usable or computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a Random Access Memory (RAM), a Read-Only Memory (ROM), an Erasable Programmable Read-Only Memory (EPROM or Flash memory), an optical fiber, and a portable Compact Disc Read-Only Memory (CD-ROM). Note that the computer-usable or computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

Computer program code for carrying out operations of the present invention may be written in a high level programming language such as C or C++. Nevertheless, some modules or routines may be written in assembly or machine language to optimize speed, memory usage, or layout of the software or firmware in memory. Assembly language may be used to implement time-critical code segments. In a preferred embodiment, the present invention uses assembly language to implement most software programs. It should further be understood that the program code for carrying out operations of the present invention may also execute entirely on a client modem, partly on a client modem, partly on a client modem and partly on a server modem, or partly in a client modem, partly in a server modem, and partly in the PSTN.

High Level Description

Figure 3:
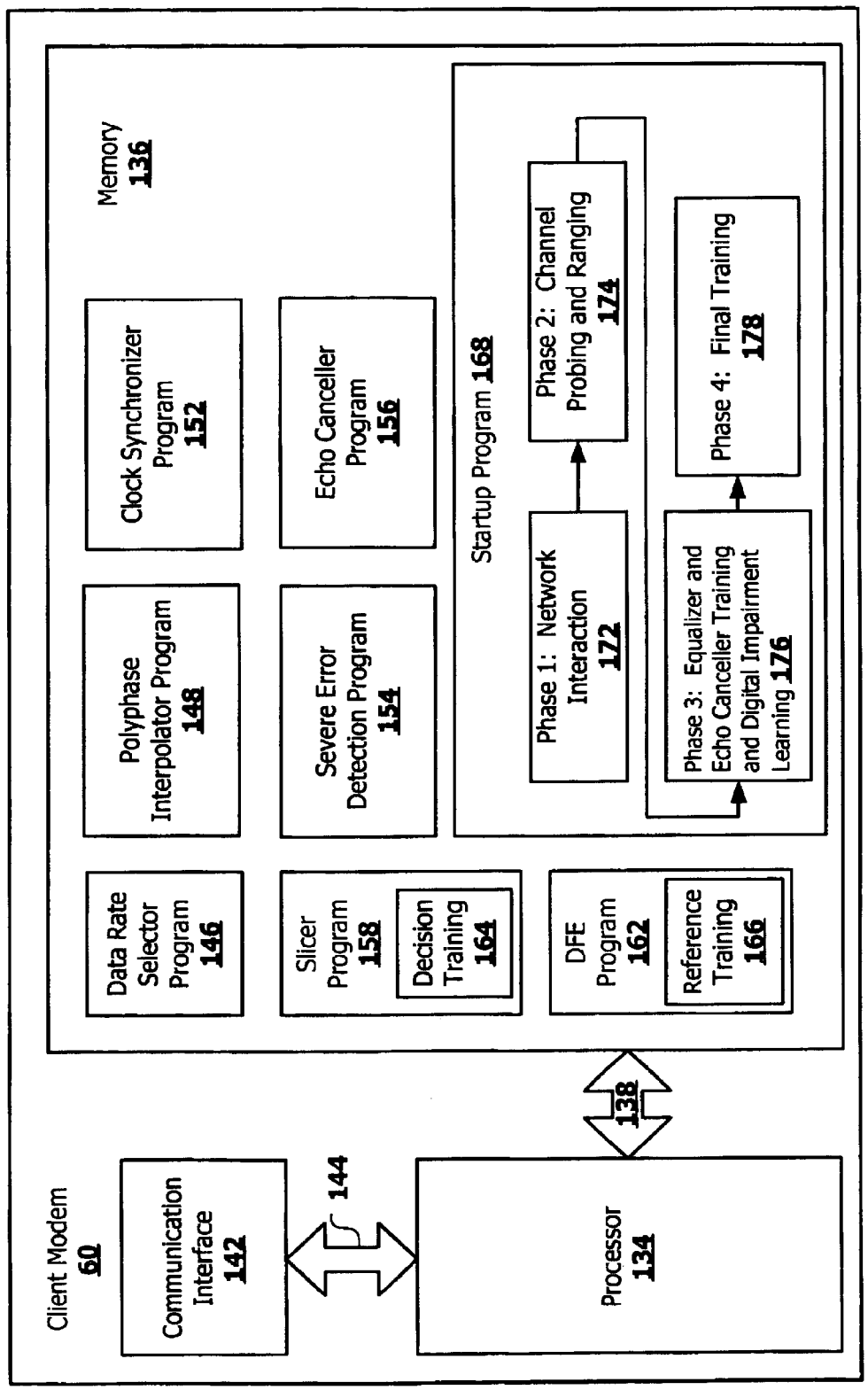
FIG. 3 is a block diagram of a client modem according to an embodiment of the present invention.

Referring now to FIG. 3, a block diagram of a client modem 60 according to the present invention is shown. The client modem 60 includes a processor 134, preferably a digital signal processor, which communicates with a memory 136 via an address/data bus 138. In addition, the processor 134 can receive and transmit information to external devices via a communication interface 142, which is accessed through input/output (I/O) bus 144. The processor 134 can be any commercially available or custom processor, preferably suitable for a real-time intensive embedded application.

The memory 136 is representative of the overall hierarchy of memory devices containing the software and data used to implement the functionality of the V.90 client modem 60. The memory 136 can include, but is not limited to, the following types of devices: cache, ROM, PROM, EPROM, EEPROM, flash, SRAM, and DRAM. As shown in FIG. 3, the memory 136 can include program modules for implementing the functionality of the components of the client modem 60. Preferably, the memory 136 can include a data rate selector program module 146, a polyphase interpolator program module 148, a clock synchronizer program module 152, a severe error detector program module 154, an echo canceller program module 156, a slicer program module 158, and a Decision Feedback Equalizer (DFE) program module 162. The slicer program module 158 and the DFE program module 162 preferably include a decision training program sub-module 164 and a reference training program sub-module 166 respectively, which are used for signaling alphabet identification. These program modules and sub-modules can operate independent of the present invention need not be described further herein.

The memory 136 further includes a startup program module 168 which implements the multi-phase startup protocol defined in the V.90 recommendation. More specifically, the startup program module 168 includes a Phase 1: Network Interaction module 172 and a Phase 2: Channel Probing and Ranging module 174. These modules are described in the V.90 standard, and need not be described further herein. As also shown in FIG. 3, a Phase 3: Equalizer and Echo Canceller Training and Digital Impairment Learning module 176 is provided. As will be described in detail below, the present invention can provide improved digital impairment learning for the Phase 3 module 176. Finally, a Phase 4: Final Training module 178 is provided, as is described in the V.90 specification. Other modules also may be included in the startup program 168, which need not be described in detail herein.

The present invention is described with reference to block diagrams and flowchart illustrations of methods, apparatus (systems), and computer program products according to an embodiment of the invention. It will be understood that each block of the block diagrams and flowchart illustrations, and combinations of blocks, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the block or blocks.

These computer program instructions may also be stored in a computer-usable or computer-readable memory that can direct a computer or other programmable data processing apparatus to function in a particular manner, such that the instructions stored in the computer-usable or computer-readable memory produce an article of manufacture including instruction means that implement the function specified in the block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the block or blocks.

During startup of a V.90 modem, the analog modem receiver performs signaling alphabet identification. This can be performed, for example, during DIL signal reception, in which pre-specified signal levels are received in each of a plurality, such as six, of DIL intervals. The learned signal levels (and the corresponding ucodes) may be stored in memory for use in determining the combination of digital impairments present in the network. The digital impairments of interest include PADs and RBS impairments. The PAD level and the type of RBS can also be determined.

In the digital network, the PAD and RBS impairments can be encountered in a variety of combinations, which can change from connection to connection. In a particular DIL interval, one can encounter no PAD and no RBS, RBS only, PAD only, RBS followed by PAD, PAD followed by RBS, RBS followed by PAD followed by RBS and/or multiple PADs with possible RBS before, between, and/or after PADs. Multiple PADs also are referred to as tandem PADs. Note that typically, PADs affect all six DIL intervals in the same manner, while different RBS types can be present in different DIL intervals.

Digital tandem PADs can exist in a telephone network due, for example, to the wide existence of private PBX systems. A PBX system may apply a digital PAD either without the knowledge of or ignoring the fact that there is already a digital PAD in the digital link at the central office. Examples of tandem digital PADs found in the North American telephone networks due to the existence of PBX systems are: 2.055 dB/2.055 dB, 6.02 dB/6.02 dB, and 3.01 dB/6.02 dB, etc. Table 1 shows a list of possible single PADs which may exist in a network connection. Note that for computational convenience, Table 1 contains two 16 bit entries for each possible pad, the pad value in dB, and the corresponding linear attenuation. Table 2 shows multiple PADs in tandem that were detected in an actual network. Table 3 shows a more extensive list of hypothetical tandem PADs that may arise in a network.

TABLE 1

| | |
|---|---|
| dd 1w 24249 | 2.615 dB linear |
| dd 1w 5356 | 2.615 dB |
| dd 1w 32767 | 0.00 dB linear |
| dd 1w 0 | 0.00 dB |
| dd 1w 29205 | 1.00 dB linear |
| dd 1w 2048 | 1.00 dB |
| dd 1w 27571 | 1.50 dB linear |
| dd 1w 3072 | 1.50 dB |
| dd 1w 26789 | 1.75 dB linear |
| dd 1w 3584 | 1.75 dB |
| dd 1w 25864 | 2.055 dB linear |
| dd 1w 4209 | 2.055 dB |

TABLE 1-continued

| | |
|---|---|
| dd 1w 26028 | 2.00 dB linear |
| dd 1w 4096 | 2.00 dB |
| dd 1w 25290 | 2.25 dB linear |
| dd 1w 4608 | 2.25 dB |
| dd 1w 24574 | 2.50 dB linear |
| dd 1w 5120 | 2.50 dB |
| dd 1w 23170 | 3.0103 dB linear |
| dd 1w 6165 | 3.0103 dB |
| dd 1w 23198 | 3.00 dB linear |
| dd 1w 6144 | 3.00 dB |
| dd 1w 21279 | 3.75 dB linear |
| dd 1w 7680 | 3.75 dB |
| dd 1w 20675 | 4.00 dB linear |
| dd 1w 8192 | 4.00 dB |
| dd 1w 20089 | 4.25 dB linear |
| dd 1w 8704 | 4.25 dB |
| dd 1w 19519 | 4.50 dB linear |
| dd 1w 9216 | 4.50 dB |
| dd 1w 18965 | 4.75 dB linear |
| dd 1w 9728 | 4.75 dB |
| dd 1w 18427 | 5.00 dB linear |
| dd 1w 10240 | 5.00 dB |
| dd 1w 17904 | 5.25 dB linear |
| dd 1w 10752 | 5.25 dB |
| dd 1w 16384 | 6.0206 dB linear |
| dd 1w 12330 | 6.0206 dB |
| dd 1w 16423 | 6.00 dB linear |
| dd 1w 12288 | 6.00 dB |
| dd 1w 14637 | 7.00 dB linear |
| dd 1w 14336 | 7.00 dB |
| dd 1w 13045 | 8.00 dB linear |
| dd 1w 16384 | 8.00 dB |
| dd 1w 11627 | 9.00 dB linear |
| dd 1w 18432 | 9.00 dB |
| dd 1w 10362 | 10.00 dB linear |
| dd 1w 20480 | 10.00 dB |
| dd 1w 9235 | 11.00 dB linear |
| dd 1w 22528 | 11.00 dB |
| dd 1w 8231 | 12.00 dB linear |
| dd 1w 24576 | 12.00 dB |
| padTableSize dd 1w 26 | Number of two word records in padTable |
| ;v90040199 | |

TABLE 2

| PAD#1 | PAD#2 |
|---|---|
| 2.055 dB | 2.055 dB |
| 6.021 dB | 6.021 dB |
| 6.00 dB | 4.00 dB |

TABLE 3

| PAD#1 | PAD#2 |
|---|---|
| 2.00 dB | 2.00 dB |
| 2.00 dB | 3.00 dB |
| 2.00 dB | 4.00 dB |
| 2.00 dB | 5.00 dB |
| 2.00 dB | 6.00 dB |
| 3.00 dB | 2.00 dB |
| 3.00 dB | 3.00 dB |
| 3.00 dB | 4.00 dB |
| 3.00 dB | 5.00 dB |
| 3.00 dB | 6.00 dB |
| 4.00 dB | 2.00 dB |
| 4.00 dB | 3.00 dB |
| 4.00 dB | 4.00 dB |
| 4.00 dB | 5.00 dB |
| 4.00 dB | 6.00 dB |
| 5.00 dB | 2.00 dB |
| 5.00 dB | 3.00 dB |

TABLE 3-continued

| PAD#1 | PAD#2 |
|---|---|
| 5.00 dB | 4.00 dB |
| 5.00 dB | 5.00 dB |
| 5.00 dB | 6.00 dB |
| 6.00 dB | 2.00 dB |
| 6.00 dB | 3.00 dB |
| 6.00 dB | 4.00 dB |
| 6.00 dB | 5.00 dB |
| 6.00 dB | 6.00 dB |

Identification of digital impairments by performing signature analysis and by performing signal level comparison analysis according to the present invention now will be described. Preferred embodiments for performing signal level comparison analysis then will be described. This description is based on U.S. Pat. No. 6,766,381 entitled Systems, Methods and Computer Program Products for Identifying Digital Impairments In Modem Signals, issued Jul. 20, 2004 and assigned to the assignee of the present invention, the disclosure of which is hereby incorporated herein by reference in its entirety. Preferred embodiments for performing signature analysis then will be described. This description is based upon copending application Ser. No. 09/430,217 entitled Systems, Methods And Computer Program Products For Identifying Digital Impairments In Modems Based On Clusters and/or Skips In Pulse Code Modulation Signal Levels, filed concurrently and assigned to the assignee of the present invention, the disclosure of which is hereby incorporated therein by reference in its entirety.

Figure 4:
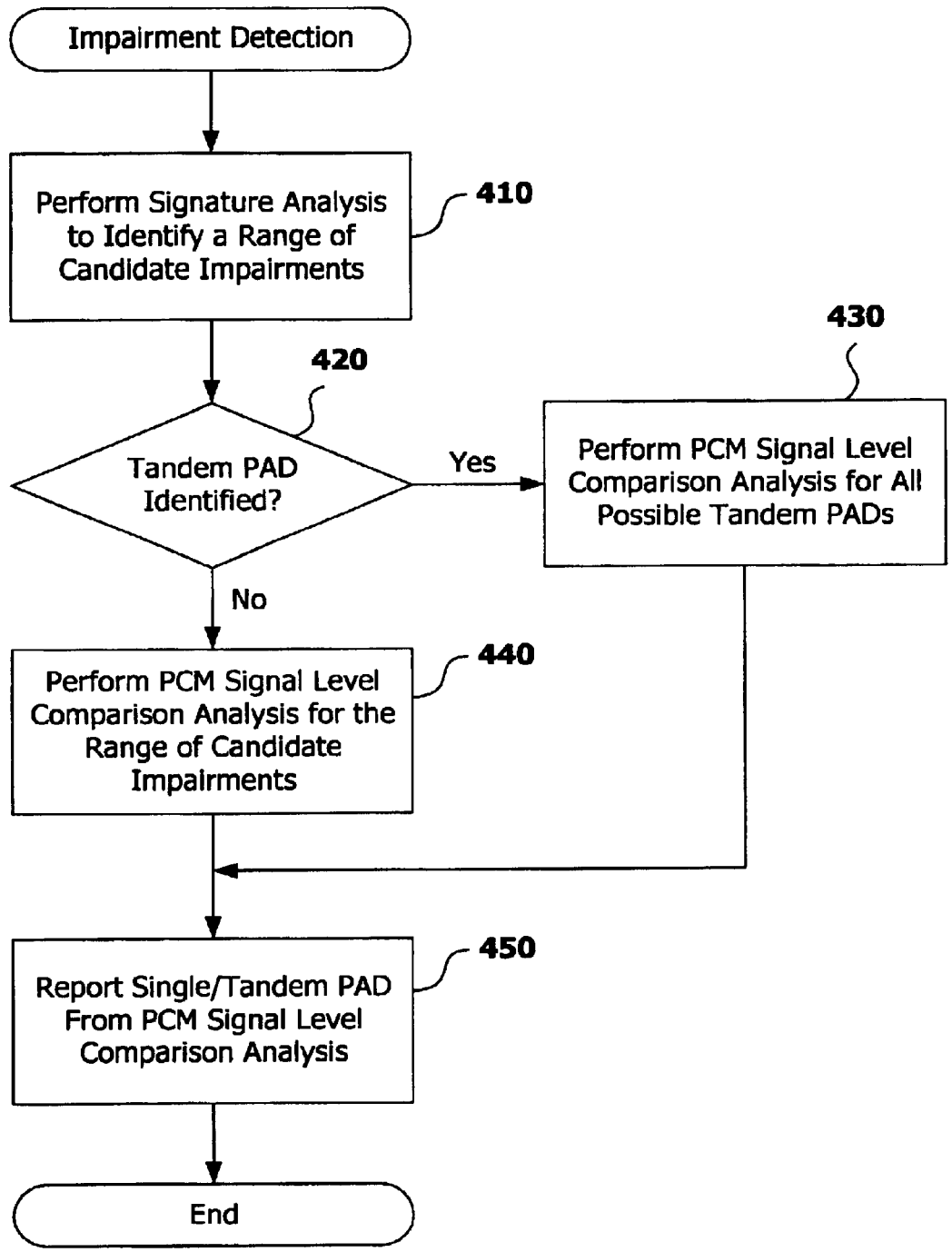
FIG. 4 is a flowchart illustrating operations for identifying digital impairments according to first embodiments of the present invention.

Referring now to FIG. 4, first embodiments for identifying a digital impairment using signature analysis and signal level comparison analysis according to the present invention will be described. First, RBS intervals preferably are determined based upon signature analysis, because signature analysis can have a more restrictive criterion than signal level comparison analysis in determining RBS and non-RBS intervals. Then, signal level comparison analysis may be used with a small step size, to search for possible intervals reported by signature analysis.

In particular, referring to FIG. 4, at Block 410, signature analysis is performed to identify a range of candidate impairments including single PAD and tandem PAD digital impairments. At Block 420, a test is made as to whether tandem PAD impairments were identified. If yes, then at Block 430, PCM signal level comparison analysis is performed for a plurality, and preferably all possible, tandem PADs, if any tandem PADs were identified by signature analysis. If tandem PADs were not identified at Block 420, then PCM signal level comparison analysis is performed for the range of candidate impairments that were identified by signature analysis. At Block 450, the single or tandem PAD that results from the PCM signal level comparison analysis of Block 430 or Block 440 is reported as the identified PAD.

Figure 5:
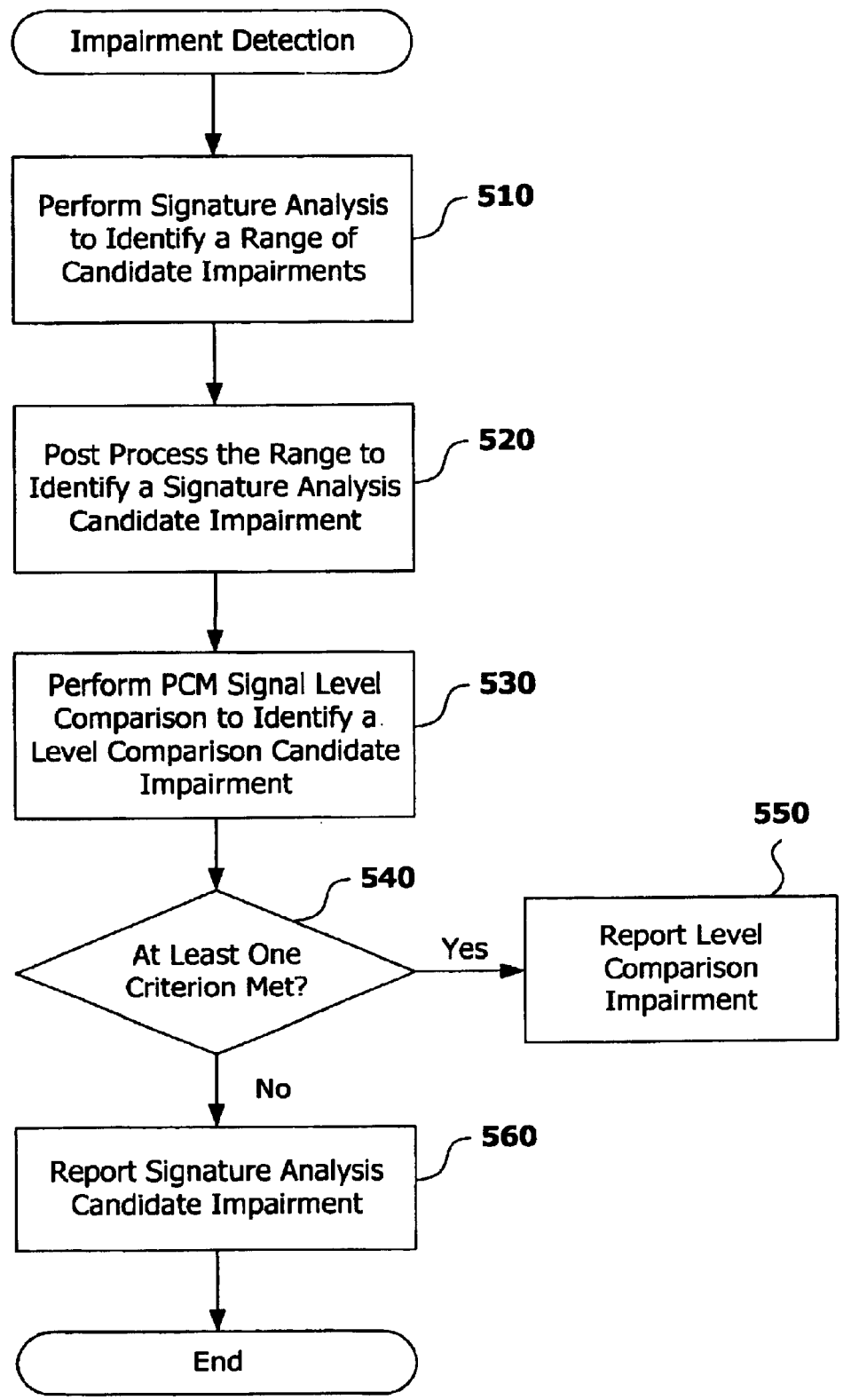
FIG. 5 is a flowchart illustrating operations for identifying digital impairments according to second embodiments of the present invention.

Referring now to FIG. 5, second embodiments of impairment detection using signature analysis and signal level comparison analysis according to the invention will be described. As was described in connection with FIG. 4, RBS intervals preferably are first determined based on signature analysis. Then, as shown in FIG. 5 at Block 510, signature analysis is performed to identify a range of candidate impairments as was described in connection with Block 410 of FIG. 4. Post-processing then is performed on the range of candidate impairments to identify a signature analysis candidate impairment at Block 520. Details of post-processing will be described below.

At Block 530, PCM signal level comparison is performed to identify a level comparison candidate impairment. At Block 540, a test is made as to whether at least one criterion is met. A detailed listing of preferred criteria will be described below. If at least one criterion is met, then at Block 550, the level comparison candidate impairment is used. In contrast, if at least one criterion is not met at Block 540, the signature analysis candidate impairment is used at Block 560.

A detailed description of post-processing a range of candidate impairments to identify a signature analysis candidate impairment (Block 520 of FIG. 5) now will be described. The combination of cluster and skip counts may result in many single PAD intervals and tandem PADs. A PAD interval refers to a range of possible PAD values which may be identified based on the cluster and/or skip counts. Accordingly, signature analysis generally reports a plurality of single PAD intervals and/or tandem PADs. Post-processing then can perform the following tests to select or identify the signature analysis candidate impairment:

T1. If both cluster and skip counts are 0, select 0 dB.
T2. If no single PAD interval is found, and there are tandem PADs indicated, then select the average of the tandem PADs.
T3. If there is only one single PAD interval indicated, select mid-point of that interval.
T4. If there are two single intervals indicated and also tandem PADs are indicated, select the mid-point of the second interval.
T5. If there are two single intervals indicated and there is no tandem PAD, select the mid-point of the first interval if (cluster−skip counts)<2, else select the mid-point of the second interval.
T6. If there are more than two single intervals indicated, select the mid-point of the second to the last interval, then adjust final PAD report using the difference of cluster and skip counts:
  T6.1. If cluster−skip count<4, and PAD>6.25 dB, select the mid-point of the next interval.
  T6.2. If 4 # cluster−skip counts<8, and PAD # 5.75 dB, select the mid-point of the next interval.
  T6.3. If 4 # cluster−skip counts<8, and PAD>9 dB, select the mid-point of the previous interval.
  T6.4. If cluster−skip counts $ 8, and PAD<9 dB, select the mid-point of the next interval.

Figure 6:
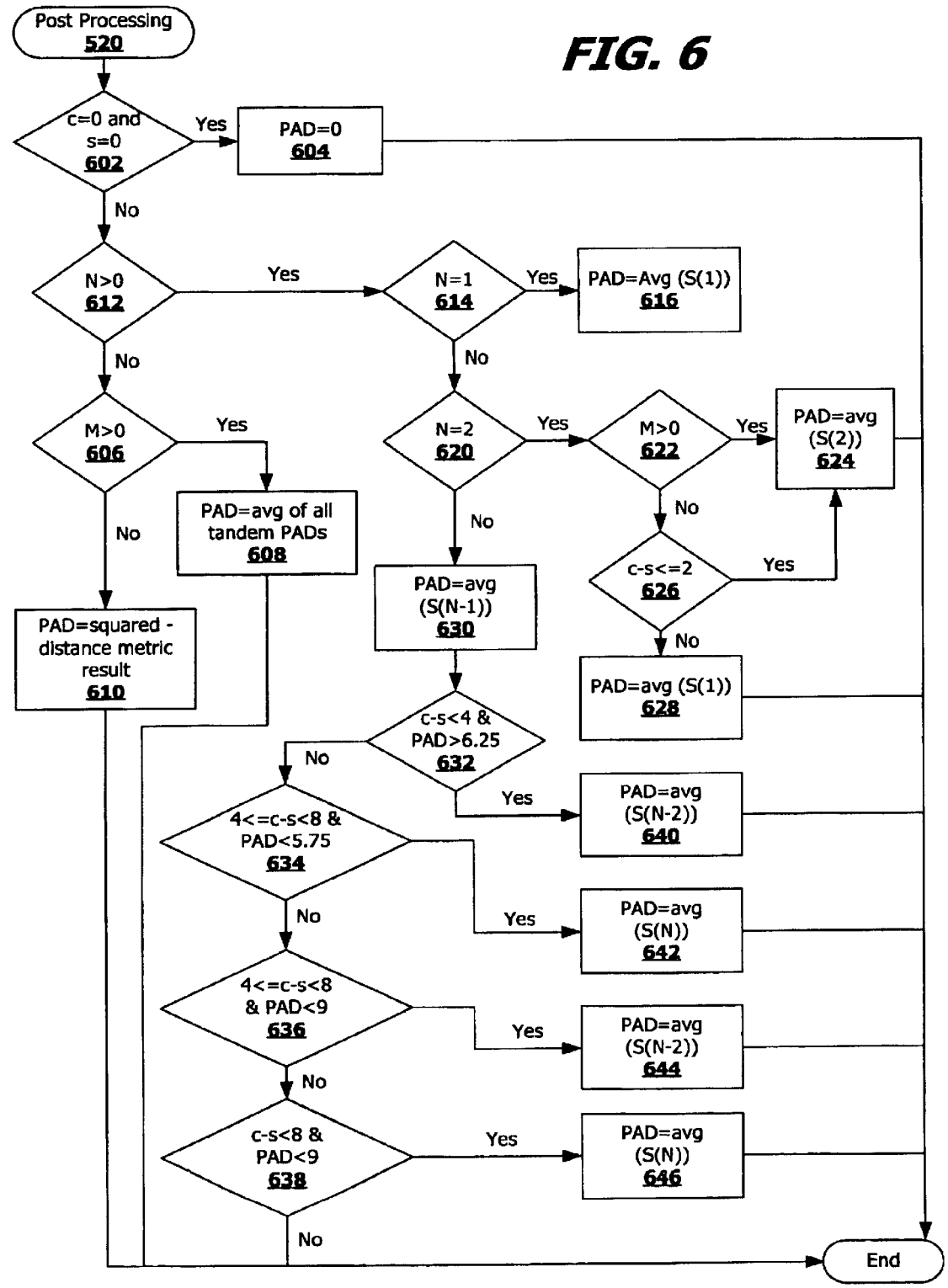
FIG. 6 is a flowchart illustrating operations for identifying digital impairments for post processing of FIG. 5 according to the present invention.

FIG. 6 is a flowchart illustrating the above-described tests T1–T6.4. FIG. 6 assumes that signature analysis reports N single PAD intervals and M tandem PADs when cluster counts=c and skip counts=s. In the flowchart, S(i) is the i-th single PAD interval, (a__i, b__i) and avg(s(i)=(a__i+b__i)/2.

Referring now to FIG. 6, Blocks 602 and 604 correspond to test T1 shown above. Blocks 606, 608 and 610 correspond to test T2 described above. Blocks 612, 614 and 616 correspond to test T3 shown above. Blocks 620, 622 and 624 correspond to test T4 above. Blocks 626 and 628 correspond to test T5 described above. Finally, Blocks 632–646 correspond to test T6 including subtests T6.1 –T6.4 described above.

Finally, a detailed description of the at least one criteria of Block 540 now will be provided. In particular, the level comparison candidate impairment is used only if one of the following criteria is met:
  C1. If a transcoding flag is set.
  C2. If an Alaw flag is set.
  C3. If signature analysis reports no non-RBS interval.
  C4. If signature analysis cannot find any PAD for a combination of cluster and skip counts.
  C5. If the absolute difference of signature analysis and PCM signal level comparison results is more than a threshold, e.g., 1.25 dB.
  C6. If the PCM signal level analysis detects 4.5 dB. This may be a weak spot of signature analysis PAD selection. Note that 4.5 dB preferably is included in the PCM signal level comparison table.
  C7. If there is one mapping interval detected as a non-RBS interval by both the PCM signal level comparison analysis and signature analysis. The PAD result from using signature analysis and the PCM signal level comparison analysis results is within 1.25 dB of the actual PAD in general.

Having described digital impairment identification using both signature analysis and signal level comparison analysis according to the present invention, detailed analysis of preferred embodiments of signature analysis and signal level comparison analysis now will be provided.

PCM Signal Level Comparison Analysis

Figure 7:
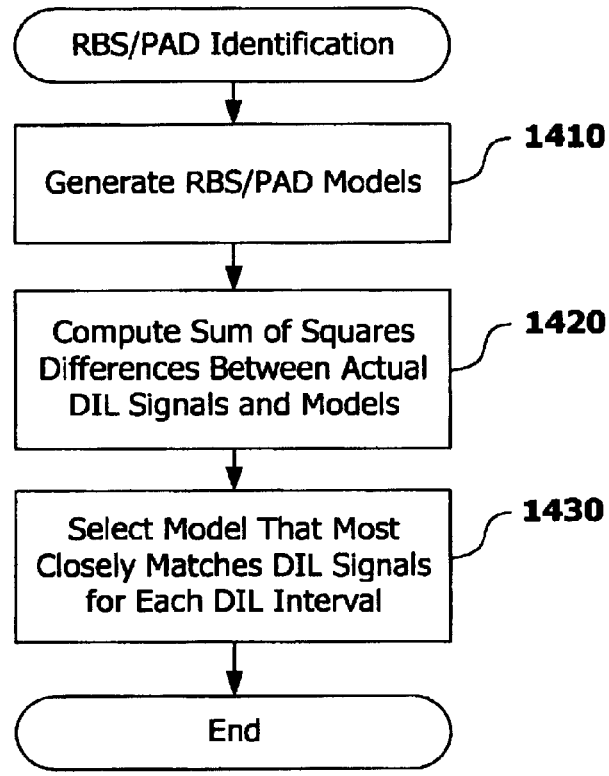
FIG. 7 is a flowchart illustrating operations for identifying RBS and PAD digital impairments according to an embodiment of PCM Signal level comparison analysis.

FIG. 7 is a flowchart illustrating overall operations for identifying RBS and PAD digital impairments in a plurality of sets of DIL signals that are repeatedly transmitted from a server modem to a client modem 60 during the Phase 3 processing 176 of FIG. 3, according to an embodiment of the present invention. As shown in FIG. 7, a plurality of RBS/PAD models are generated at Block 1410. In particular, the range of values of PADs that can be encountered are stored in a table and/or determined computationally, for example by specifying the minimum and maximum values and an increment that is repeatedly added to the minimum to generate all the intermediate values. Note however that the precise quantization rule used in a particular PAD implementation may not be known. The possible types of RBS are assumed to be known.

Then, referring to Block 1420, differences, such as sum of squares of differences, between actual DIL signals and the models of the DIL signals having combinations of RBS types and PAD levels, are determined. As shown in Block 1430, for each interval, a model is selected based on the computation. Preferably, the model that most closely matches the DIL signals is selected. For example, the model with the smallest sum of squares of differences is selected for that DIL interval.

It will be understood that the operations of FIG. 7 need not be completed over one set or frame of six DIL intervals. Rather, the V.90 startup protocol can allow a design sufficient time to continue receiving the DIL sequences while searching the model space using refined DIL averages. Once a model match has been determined, the client V.90 modem can signal the server to terminate the DIL sequences. Thus, startup duration may be traded off against computational burden on the processor searching the entire model space.

Figure 8:
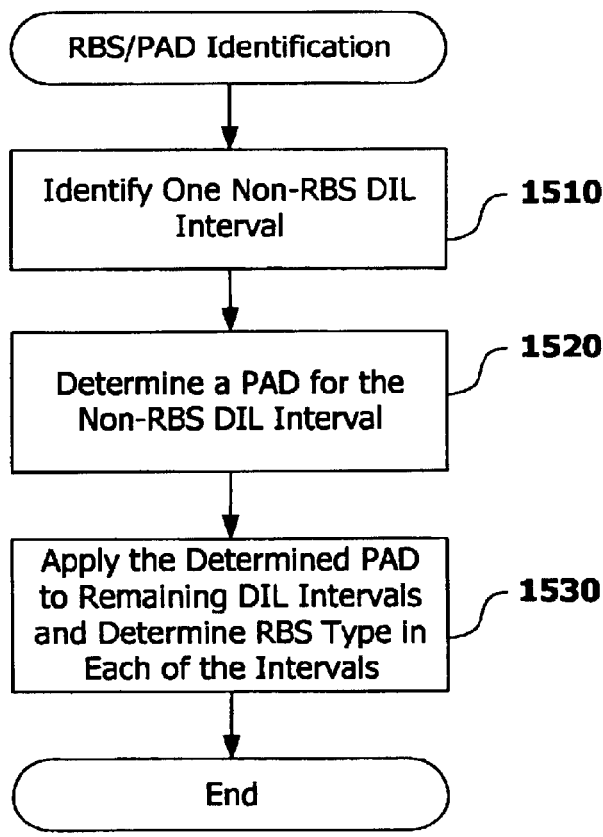
FIG. 8 is a flowchart illustrating operations for identifying RBS and PAD digital impairments according to an embodiment of PCM signal level comparison analysis.

FIG. 8 is a flowchart illustrating operations for identifying RBS and PAD digital impairments in a plurality of sets of DIL signals that are repeatedly transmitted from the server modem to a client modem during a corresponding plurality of DIL intervals, according to a second embodiment. As shown in FIG. 8, one of the DIL intervals that contains DIL signals that are not subject to RBS (a "non-RBS DIL interval") is identified from among the plurality, such as six, of sets of DIL signals (Block 1510). Then, as shown in Block 1520, a PAD is determined for the non-RBS DIL interval. In other words, the learned levels are used in the non-RBS interval to determine the PAD level. Finally, at Block 1530, the determined PAD level is applied to the DIL signals in the remaining ones of the DIL intervals, to identify an RBS type for the DIL signals in the remaining ones of the DIL intervals. In other words, using the PAD information, the type of RBS present in each of the DIL intervals may be determined.

Accordingly, a PAD level is first identified for the DIL intervals, preferably using model DIL signals that correspond to non-RBS PAD levels. Then, an RBS type is identified for individual DIL intervals, preferably using model DIL signals that correspond to multiple RBS types for the identified PAD level.

One non-RBS DIL interval may be identified at Block 1510 by obtaining sets of model DIL signals that correspond to multiple PAD levels that are not subject to RBS. These model DIL signals then may be compared to the sets of DIL signals in the DIL intervals. One of the DIL intervals may be selected, preferably the DIL interval that contains DIL signals that most closely match a set of model DIL signals, to thereby identify one of the DIL intervals that contains non-RBS DIL signals. A sum of squares may be used to compare the model non-RBS DIL signals to the actual DIL signals in each DIL interval.

In Block 1520, a PAD level for the non-RBS DIL interval may be determined by obtaining a plurality of sets of model DIL signals that correspond to a plurality of non-RBS PAD levels. The DIL signals in the one of the DIL intervals so identified may be compared to the plurality of sets of model DIL signals. One of the sets of model DIL signals is selected, based on the comparison. Preferably, the set of model DIL signals that most closely matches the DIL signals is selected, to thereby determine a PAD level for the non-RBS DIL signals.

Finally, at Block 1530, in order to apply the determined PAD to the remaining DIL intervals, a plurality of sets of model DIL signals, that corresponds to a plurality of RBS types for the PAD so determined, is obtained. The DIL signals in the remaining ones of the DIL intervals are compared with the model DIL signals. One of the sets of model DIL signals is selected, preferably based upon a closest match, to thereby identify an RBS type for DIL signals in the remaining ones of the DIL intervals.

It will be understood that in the above-described embodiments, the values of PADs and RBS levels to be used may be dynamically specified based on various criteria such as quality of connection, estimates for attenuation from Phase 2 of startup and/or other criteria. Moreover, not all of the DIL signals need to be used to perform the comparison. Rather, only a subset of the DIL signals in the DIL intervals may be used to determine the digital impairments. Thus, for example, the lowest values of the DIL signals that may be overpowered by noise and the highest values of the DIL signals that may be subject to distortion, need not be used for testing.

More specifically, the minimum distance measurement for determining digital impairments may be performed using only a subset of the learned signal levels. A preferred embodiment may specify the subset by setting a minimum ucode and a maximum ucode. Only the signal levels corresponding to within and including the minimum and maximum ucodes may be used in the minimum distance measurement. A reason for selecting the minimum ucode is to exclude the very low signal levels where noise may be dominant. On the other hand, selecting the maximum ucode may exclude some of the very high signal levels which may contain large nonlinear distortion. It also is possible to provide nonlinear distortion measurement which may be used to measure the nonlinear distortion for the high level ucodes and determine the maximum ucode dynamically for each connection.

Finally, if Block 1530 determines that one of the remaining ones of the DIL intervals also is not subject to RBS, i.e. there is more than one non-RBS interval, the DIL signals in the initially identified non-RBS interval may be compared to DIL signals in a subsequently identified non-RBS DIL interval. Stated differently, the non-RBS interval detected in Block 1510 may be compared to a non-RBS interval or intervals that are detected at Block 1530. If these match, then the results of RBS/PAD identification may be accepted. Otherwise, a flag may be set to signal a mismatch that can be handled separately.

Each of Blocks 1510–1530 will now be described at an intermediate level.

Non-RBS interval identification (Block 1510)—Processing in this block assumes that at least one of the signaling intervals has no RBS present. The following operations may be performed:

for each signaling interval I,
    for each PAD value p,
        compute ideal signal levels assuming no RBS before or after PAD
        compute the sum of squares of the difference between the ideal signal level and learned signal levels
    end
end
Select the interval with the smallest sum of squares as the non-RBS interval.

PAD determination (Block 1520)—Using the learned signal levels in the detected non-RBS interval, the value of the digital attenuation PAD may be determined as follows:

for each PAD value p
    compute the ideal signal levels assuming no RBS and PAD value p
    scale the ideal signal levels to account for the equalizer training in the presence of PAD p
    compute the sum of squares of the difference between the learned levels and a scaled ideal value
end
Select the PAD value pad_result corresponding to the smallest sum of squares as the detected PAD value.

Figure 9:
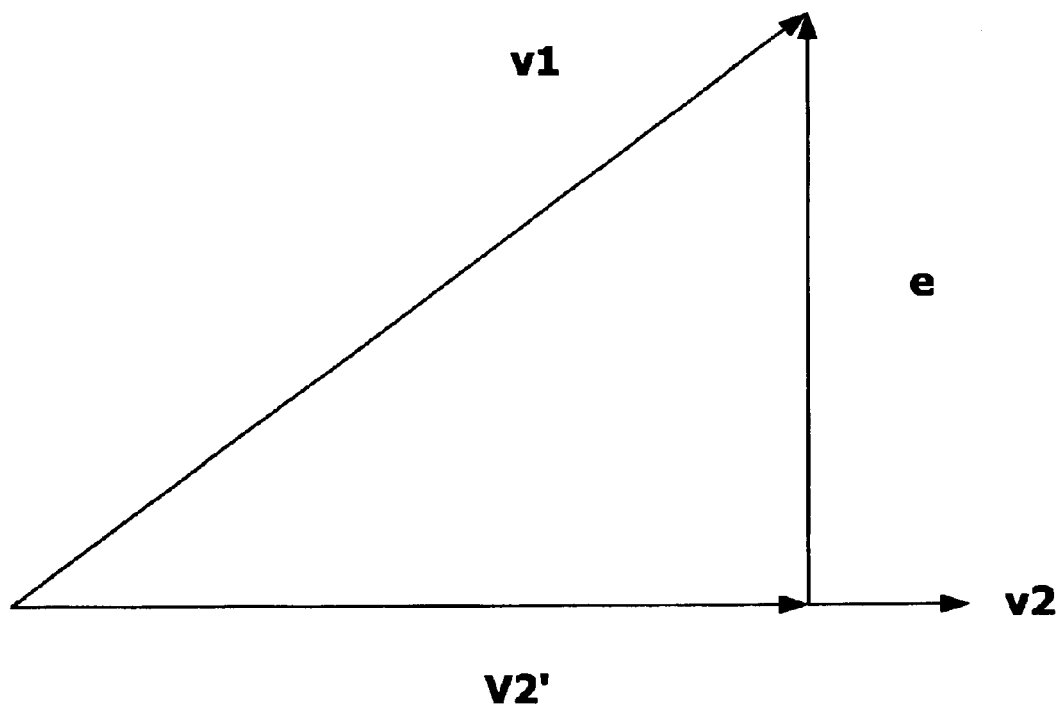
FIG. 9 graphically illustrates use of a scale factor according to PCM signal level comparison analysis.

The scale factor s for use in Block 1520 may be obtained as follows: Form a first vector $v_1$ from the learned signal levels, sorted according to increasing ucode values. Form a second vector $v_2$ from the ideal signal levels corresponding to the PAD value under consideration. Project $v_1$ on $v_2$ orthogonally, yielding $v_2'=s \cdot v_2$, and determine $\|e\|^2$, where $e=v_1-v_2'$, and $\|.\|^2$ is the sum of squares of the components of the argument vector. Minimizing $\|e\|^2$ with respect to a scale factor alpha yields the scale factor $s=v_1 \cdot v_2'/\|v_2\|^2$, wherein the '•' in the numerator indicates the dot product. FIG. 9 illustrates this concept using two-dimensional vectors. Note that in a preferred embodiment, the vectors generally will have a much larger dimension.

RBS detection (Block 1530)—Using the detected PAD value, the type of RBS present in each signaling interval may be determined as follows:

for each signaling interval I,
    for each RBS type c,
        compute the ideal signal levels assuming PAD value pad_result
        scale the ideal signal levels to account for the equalizer training in the presence of the PAD
        compute the sum of squares of the difference between the learned levels, and a scaled ideal value
    end
    select the PAD/RBS combination corresponding to the smallest sum of squares
end Based on the outcome of these three blocks, a PAD value and an RBS type for each interval are selected as the model of the digital impairments present in the network during this particular connection.

The following pseudocode describes a detailed implementation for an embodiment of Blocks 1510, 1520 and 1530 of FIG. 8.

```
Non-RBS Interval Identification (Block 1510):
;************************************************************
; Begin: padmode==1: Determine a non-RBS interval for findpad( ).
;
; short int c_pad_nrbs = {6652,6140,4604,4092,3004,2236,1564,924,
292};
;
;       min_dist=2^16-1;
;       for (i=0; i<NUM_PAD_GAINS; ++i) {
;
;           pad_gain=10^(-attnDB(i)/20);
;           TRN2scale=3772/(4*pcmexp(pcmcomp(3772*pad_gain/4)));
;
;           for (j=0; j < 6; ++j) {
;
;               for (k=0; k < SIZE_CONST; ++k) {
;
;                   c_pad_nrbs(k)=
;                   4*pcmexp(pcmcomp(c_pad_nrbs(k)*pad_gain/4));
;                   c_pad_nrbs(k)=c_pad_nrbs(k)*TRN2scale;
;               }
;               dist=0;
;               for (k=0; k < SIZE_CONST; ++k)
;                   dist=dist+abs(TRN18level(j,k)-c_pad_nrbs(k));
;
;               if (dist < min_dist) {
;
;                   min_dist=dist;
;                   interval=j;
;               }
;           }
;       }
PAD Determination (Block 1520):
;************************************************************
; Begin: padmode==2: Compute digital gain value that generates
;                    the closest match between learned constellation and
;                    computed constellation.
;
;       min_dist=2^32-1;
;       for (i=0; i<NUM_PAD_GAINS; ++i) {
;
;           pad_gain=10^(-attnDB/20);
;
;           /* compute constellation for given pad gain after
companding/expanding */
;
;           for (j=0; j<CONST_SIZE; ++j) {
;
;               if (mulaw)
;                   c_x_lin(j)=
;           4*pcmexp(pcmcomp(c_npad_nrbs(k)*pad_gain/4));
;               else
;                   c_x_lin(j)=
;           8*pcmexp(pcmcomp(c_npad_nrbs(k)*pad_gain/8));
;           }
;
;           /* compute sum(c_lin[i]*c_x_lin[i]) and
;               sum(c_x_lin[i]^2) */
;
;           for (j=0; j<SIZE_CONST; ++j) {
;               sum_num+=c_lin(j)*c_x_lin(j);
;               sum_denom+=c_x_lin(j)*c_x_lin(j);
;           }
;
;           /* compute gain term */
;
;           alpha=sum_num/sum_denom;
;
;           /* compute error for given digital gain pad */
;
;           for (j=0; j<SIZE_CONST; ++j)
;               error+=(c_lin(j)-alpha*c_x_lin(j))^2;
;
;           /* find pad gain with minimum error*/
;
;           if (error < min_dist)
;               pad_detected=attnDB(i);
;       }
RBS Detection (Block 1530):
;************************************************************
; Begin: padmode > 2: Calculate the RBS type for each interval in the
6T frame.
;
; /* Compute linear values for each of 6 RBS combinations
given the digital */
; /* pad detected:                                              */
; /* 0.) No RBS                                                 */
; /* 1.) 1-RBS before PAD                                       */
; /* 2.) 1-RBS at codec, after PAD                              */
; /* 3.) ½ RBS at codec, after PAD                              */
; /* 4.) 0-RBS at codec, after PAD                              */
; /* 5.) ½ RBS at codec, before PAD                             */
; /* 6.) 0-RBS before PAD                                       */
; /* 7.) 1-RBS before PAD followed by 1-RBS at codec,
after PAD: compound rbs */
;
; /* Case 0: no RBS                                 */
;
;       for (j=0; j < CONST_SIZE; ++j) {
;           RBScase(0,j)=4*pcmexp(g711gpcm(c_in(j)));
;           RBScase(0,j)=4*pcmexp(pcmcomp(RBScase(0,j)*padgain/4));
;       }
;
; /* Case 1: 1-RBS before PAD                       */
;
;       for(j=0; j < CONST_SIZE; ++j) {
;           RBScase(1,j)=4*pcmexp(g711gpcm(c_in(j)+1-rem(c_in(j),2)));
;           RBScase(1,j)=4*pcmexp(pcmcomp(RBScase(1,j)*padgain/4));
;       }
;
; /* Case 2: 1-RBS at codec, after PAD              */
;
;       for (j=0; j <CONST_SIZE; ++j) {
;           RBScase(2,j)=
gpcmg711(pcmcomp(pcmexp(g711gpcm(c_in(j)))*padgain)));
;           RBScase(2,j)=
4*pcmexp(g711gpcm(RBScase(2,j)+1-rem(RBScase(2,j),2)));
;       }
;
; /* Case 3: ½ RBS at codec, after PAD              */
;
;       for (j=0; j <CONST_SIZE; ++j) {
;           RBScase(3,j)=
gpcmg711(pcmcomp(pcmexp(g711gpcm(c_in(j)))*padgain)));
;           pcm_pad0=RBScase(3,j) - rem(RBScase(3,j),2);
;           pcm_pad1=pcm_pad0 + 1;
;           RBScase(3,j) =4*(pcmexp(g711gpcm(pcm_pad0(j))) +
 pcmexp(g711gpcm(pcm_pad1(j))))/2;
;       }
;
; /* Case 4: 0-RBS at codec, after PAD              */
;
;       for(j=0; j < CONST_SIZE; ++j) {
;           RBScase(4,j)=
gpcmg711(pcmcomp(pcmexp(g711gpcm(c_in(j)))*padgain)));
;           RBScase(4,j)=
4*pcmexp(g711gpcm(RBScase(4,j)-rem(RBScase(4,j),2)));
;       }
;
; /* Case 5: ½ RBS at codec, before PAD             */
;
;       for (j=0; j < CONST_SIZE; ++j) {
;           pcm0(j)=c_in(j) - rem(c_in(j),2);
;           pcm1(j)=pcm0(j) + 1;
;           RBScase(5,j) = (pcmexp(g711gpcm(pcm0(j))) +
pcmexp(g711gpcm(pcm1(j))))/2;
;           RBScase(5,j)=4*pcmexp(pcmcomp(RBScase(5,j)*padgain));
;       }
```

-continued

```
;
; /* Case 6: 1-RBS before PAD          */
;
;     for (j=0; j < CONST_SIZE; ++j) {
;         RBScase(6,j)=4*pcmexp(g711gpcm(c_in(j)-1+rem(c_in(j),2)));
;         RBScase(6,j)=4*pcmexp(pcmcomp(RBScase(6,j)*padgain/4));
;     }
;
;
; /* Case 7: 1-RBS before PAD, 1-RBS at codec,
after PAD: compound RBS */
;
;     for (j=0; j < CONST_SIZE; ++j) {
;         RBScase(6,j)=RBScase(1,j)/4;
;         RBScase(6,j)=gpcmg711(pcmcomp(RBScase(6,j)*padgain));
;         RBScase(6,j)=
4*pcmexp(g711gpcm(RBScase(6,j)+1-rem(RBScase(6,j),2)));
;     }
;
;     for (j=0; j < 7; ++j) {
;         min_dist=0;
;         for (k=0; k < 7; ++k){
;             dist=0;
;             for (l=0; 1 < MTRN1D+NDIL; ++l)
;                 dist=dist+(PCMlevel(j,1)-RBScase(k,1))^2;
;             if (dist < min_dist)
;                 RBStype(j)=k;
;         }
;     }
```

Less common digital impairments may be handled according to the invention by storing a digital impairment model. Examples of less common impairments include the 0-RBS type where the robbed bit signaling bit is set to 0 to indicate off-hook, rather than setting it to 1. Another example is a so called 1/2-RBS type in which an average between the linear values associated with two adjacent ucodes or PCM code words is computed as the output to the D/A converter, rather than forcing the RBS output value to be based strictly on a 1-RBS or a 0-RBS. Another possible case is where the robbed bit is alternately forced to 0 and 1.

Other less common cases can include ill-behaved digital attenuators such as found on networks in Raleigh, N.C. in which the lower 6 uchords are spaced according to a normal $\mu$-law conversion characteristic, and then there is an abnormal jump in levels to the final 2 uchords. Cases of compound RBS can be determined in which there is an RBS before a PAD and an RBS after a PAD in the same six framing intervals. This can lead to a "hidden" RBS which hides behind another RBS but which can have an impact on optimum performance of the PCM modem.

There also may be cases of tandem PADs where a PBX incorporates one digital attenuator PAD without knowledge of a PAD in the network. This can lead to two digital attenuator PADs in cascade or tandem with one another between the server and client PCM modem.

Lastly, transcoding scenarios may occur where an Alaw to $\mu$law coding translation can take place. Double transcoding, where the PCM code words pass through an Alaw to $\mu$law and then $\mu$law to Alaw code translation in the digital network, also may occur. Double transcoding may be found on South Korean networks which employ US based telecommunications equipment in the backbone communications network, but which switch back to Alaw at the central office, and which originate with Alaw at an Internet Service Provider (ISP).

While each of the above less common cases may be difficult to handle without prior knowledge, once known they can be accommodated by adding them to the models of DIL signals that are searched. Because the models can be based on a complete understanding of what is happening in the network, the effective squared distance can be very small and can lead to reliable determination of digital impairments. Accordingly, a PCM modem developer can define more, and more precise, models of network scenarios and add these models to the search space. The more precise the model, the more likely one can match that model even under noisy line conditions, assuming enough levels or dimensions are available for the distance squared. Reliable and robust identification of digital impairments in PCM modems thereby may be provided.

Signature Analysis

Signature analysis stems from a realization that clusters and/or skips in the PCM signal levels may be used to provide a compressed signature of digital impairments including RBS and PAD in a connection between a client modem and a server modem. PCM codes and corresponding analog levels used in the telephone network are defined in ITU Standard G.711. Digital impairments generally involve many mapping rules of PCM codes from one level to another. When mapping these codes after digital impairment, some adjacent codes become identical or close to one another to define a cluster, and the spaces between some of the codes are about twice or about three of more times the expected value to define a skip. These clusters and/or skips, and preferably counts of clusters and skips, are used to define a signature for the digital impairment.

For example, Table 4 provides the mapping results of ucodes 1 to 108 with 0 dB (original ucodes), 3 dB and 6 dB PAD. Table 4 shows that there are some spaces that drop to zero, for example between ucodes 77 and 78 in the 3 dB case, and ucodes 44 and 45 in the 6 dB case. Moreover, some spaces become twice the normal expectation, for example ucodes 83 and 84 in the 3 dB case. In Table 4, clusters are identified by brackets to the right of the values, whereas skips are identified by brackets to the left of the values. As shown in Table 4, there are twelve clusters and eleven skips in the 3 dB PAD case, and four clusters and no skips in the 6 dB PAD case from ucodes 32 to 108. By definition, there are no clusters or skips in the 0 dB case. Thus, different PADs may have different numbers of cluster and/or skip counts. Therefore, the count information may be used to classify the digital impairments in the network.

TABLE 4

| Ucode level | 0 dB | 3 dB | 6 Db |
| --- | --- | --- | --- |
| 1 | 8 | 12] | 16] |
| 2 | 16 | 12] | 16] |
| 3 | 24 | 23 | 32] |
| 4 | 32 | 35 | 32] |
| 5 | 40 | 46] | 48] |
| 6 | 48 | 46] | 48] |
| 7 | 56 | 58 | 64] |
| 8 | 64 | 69] | 64] |
| 9 | 72 | 69] | 80] |
| 10 | 80 | 81 | 80] |
| 11 | 88 | 92 | 96] |
| 12 | 96 | 104] | 96] |
| 13 | 104 | 104] | 112] |
| 14 | 112 | 115 | 112] |
| 15 | 120 | 127 | 128] |
| 16 | 132 | 138 | 128] |
| 17 | 148 | [150 | 144 |
| 18 | 164 | [173 | 160 |
| 19 | 180 | 190] | 176 |
| 20 | 196 | 190] | 192 |
| 21 | 212 | 213 | 208 |
| 22 | 228 | 236 | 224 |
| 23 | 244 | 259] | 240 |

TABLE 4-continued

| Ucode level | 0 dB | 3 dB | 6 Db |
|---|---|---|---|
| 24 | 260 | 259] | 264] |
| 25 | 276 | 282 | 264] |
| 26 | 292 | 305] | 296] |
| 27 | 308 | 305] | 296] |
| 28 | 324 | 328 | 328] |
| 29 | 340 | 351 | 328] |
| 30 | 356 | 374] | 360] |
| 31 | 372 | 374] | 360] |
| 32 | 396 | [397 | 392 |
| 33 | 428 | [443 | 424 |
| 34 | 460 | [466 | 456 |
| 35 | 492 | [513 | 489 |
| 36 | 524 | 536 | 521 |
| 37 | 556 | 570 | 553 |
| 38 | 588 | 616] | 585 |
| 39 | 620 | 616] | 617 |
| 40 | 652 | 662 | 649 |
| 41 | 684 | 708] | 681 |
| 42 | 716 | 708] | 713 |
| 43 | 748 | 754 | 745 |
| 44 | 780 | 800 | 793] |
| 45 | 812 | 847] | 793] |
| 46 | 844 | 847] | 857] |
| 47 | 876 | 893 | 857] |
| 48 | 924 | 939 | 921 |
| 49 | 988 | [985 | 985 |
| 50 | 1052 | [1077 | 1049 |
| 51 | 1116 | [1123 | 1113 |
| 52 | 1180 | [1215 | 1177 |
| 53 | 1244 | 1261 | 1241 |
| 54 | 1308 | 1330 | 1305 |
| 55 | 1372 | 1422] | 1369 |
| 56 | 1436 | 1422] | 1434 |
| 57 | 1500 | 1515 | 1498 |
| 58 | 1564 | 1607 | 1562 |
| 59 | 1628 | 1699] | 1626 |
| 60 | 1692 | 1699] | 1690 |
| 61 | 1756 | 1791 | 1754 |
| 62 | 1820 | 1883] | 1850] |
| 63 | 1884 | 1883] | 1850] |
| 64 | 1980 | [1975 | 1978 |
| 65 | 2108 | [2160 | 2106 |
| 66 | 2236 | [2252 | 2234 |
| 67 | 2364 | [2436 | 2363 |
| 68 | 2492 | [2528 | 2491 |
| 69 | 2620 | [2712 | 2619 |
| 70 | 2748 | 2851] | 2747 |
| 71 | 2876 | 2851] | 2875 |
| 72 | 3004 | 3035 | 3003 |
| 73 | 3132 | 3219 | 3131 |
| 74 | 3260 | 3403] | 3259 |
| 75 | 3388 | 3403] | 3388 |
| 76 | 3516 | 3588 | 3516 |
| 77 | 3644 | 3772] | 3644 |
| 78 | 3772 | 3772] | 3772 |
| 79 | 3900 | 3956 | 3964 |
| 80 | 4092 | [4141 | 4220 |
| 81 | 4348 | [4509 | 4477 |
| 82 | 4604 | 4693 | 4733 |
| 83 | 4860 | [4878 | 4989 |
| 84 | 5116 | [5246 | 5246 |
| 85 | 5372 | 5431 | 5502 |
| 86 | 5628 | 5615 | 5758 |
| 87 | 5884 | 5891 | 6014 |
| 88 | 6140 | 6260 | 6271 |
| 89 | 6396 | 6628] | 6527 |
| 90 | 6652 | 6628] | 6783 |
| 91 | 6908 | 6997 | 7039 |
| 92 | 7164 | 7365 | 7296 |
| 93 | 7420 | 7734] | 7552 |
| 94 | 7676 | 7734] | 7808] |
| 95 | 7932 | 8103 | 7808] |
| 96 | 8316 | 8471 | 8193 |
| 97 | 8828 | [8840 | 8705 |
| 98 | 9340 | [9577 | 9218 |
| 99 | 9852 | [9945 | 9730 |
| 100 | 10364 | [10683 | 10243 |

TABLE 4-continued

| Ucode level | 0 dB | 3 dB | 6 Db |
|---|---|---|---|
| 101 | 10876 | 11051 | 10755 |
| 102 | 11388 | 11420 | 11268 |
| 103 | 11900 | 11973 | 11780 |
| 104 | 12412 | 12710 | 12293 |
| 105 | 12924 | 13447] | 12806 |
| 106 | 13436 | 13447] | 13318 |
| 107 | 13948 | 14184 | 13831 |
| 108 | 14460 | 14921 | 14343 |

Figure 10:
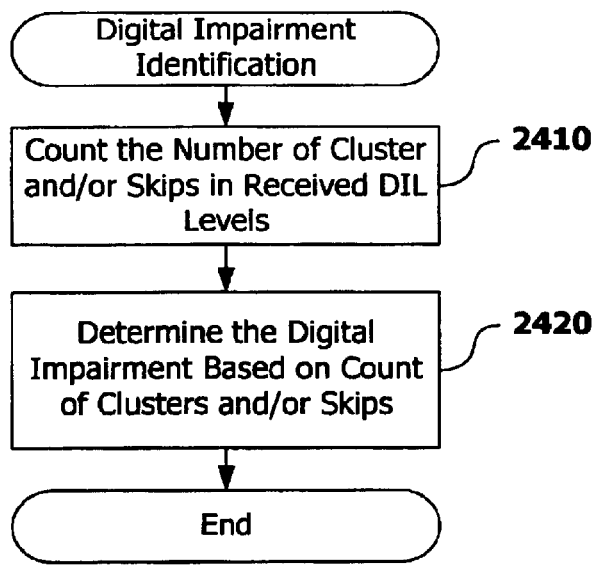
FIG. 10 is a flowchart illustrating operations for identifying digital impairments according to an embodiment of signature analysis.

FIG. 10 is a flowchart illustrating overall systems, methods and computer program products for identifying digital impairments according to an embodiment of signature analysis. Although the digital impairments may be identified in any set of PCM signals that are received at a client modem from a server modem, they preferably are identified in a plurality of sets of DIL signals that are repeatedly transmitted from the server modem to the client modem over a corresponding plurality of DIL intervals.

As shown at Block 2410, the number of clusters and/or skips in the received DIL levels are counted or accumulated. In particular, the spacing between points in the G.711 curves may be identified in all six DIL intervals. All of the DIL levels may be analyzed. However, preferably, codes of less than 32 and of more than 108 may be discarded so as not to consider codes that are unduly affected by noise or nonlinear distortion, respectively. When analyzing the spacing between adjacent DIL levels, it can be determined when the spacing suddenly drops to close to zero, which can cause the cluster count to increment, and when the spacing suddenly jumps to about twice or more the normal spacing, which can cause the skip count to increment. The spacing may suddenly drop to close to zero because two G.711 points collapse on top of one another due to a digital impairment such as a PAD. The spacing suddenly may become twice or more the normal spacing due to ne or more missing G.711 points, for example due to a digital impairment.

Then, referring to Block 2420, the digital impairment is determined based on the counts of clusters and/or skips. More specifically, a small set of lists or tables with skip and cluster counts may be computed based on noise-free compression of the G.711 curve, for example corresponding to single and tandem PADs with 0.25 dB spacing from 0 to 12 dB, and all permutations of PADs from 2 to 6 dB with 1 dB spacing. Examples of these lists or tables will be shown below.

Examination of these tables indicates that when PADs increase by 0.25 dB steps, there generally is only a small change in the skip and cluster count values. Stated differently, a "continuum" may be produced. Accordingly, if a PAD is encountered somewhere between the 0.25 dB spaced table entries, an interpolation or other technique may be used to determine the closest PAD. Thus, the skip counts and/or cluster counts may be less sensitive to variations between adjacent PAD levels compared to distance-based approaches for determining unknown PADs. The reason the skip and/or cluster counts may be less sensitive to these variations may be due to compressing the G.711 curve into a signature. As the curve is compressed with one PAD, for example 2.8 dB and compared to an ideal model skip and cluster count for 3 dB, it may be found that the signatures are quite close compared to, for example, a 5 dB or 6 dB PAD.

Each of the DIL intervals, for example six DIL intervals, can have its own associated skip and cluster count. Thus, the skip and cluster counts in the DIL intervals may be compared to one another. When two intervals have identical skip and cluster counts, an averaging function can average these two intervals together. If more than two intervals have identical skip and cluster counts, all of them can be averaged together, which can reduce the noise or variance in the DIL levels. A detailed approach for combining the skip and/or cluster counts in the received DIL intervals will be described below.

A more detailed description of operations to count the number of clusters and/or skips in the received DIL levels (Block 2410 of FIG. 10) now will be provided. In particular, although all of the received DIL levels may be examined in order to determine a count of clusters and/or skips, preferably only a subset of the DIL levels are processed to identify clusters and/or skips. In particular, due to noise in the network, codes can be distorted so that two PCM codes may become closer or farther apart than the ideal case. The small (lower value) PCM codes may be relatively more sensitive to noise, so that cluster and/or skip values may be less indicative of the signature of the digital impairments and more indicative of noise. Accordingly, a lower bound of PCM code may be set to reduce and preferably eliminate those PCM codes that may be unduly influenced by noise.

At the upper PCM codes, distortions may be introduced due to saturation over the network. Moreover, these codes may be used sparingly. Accordingly, an upper bound preferably also is set to reduce and preferably eliminate these upper codes that may be unduly influenced by saturation or other factors. In a preferred embodiment, an upper limit u of 108 and a lower limit l of 32 may be set.

Figure 11:
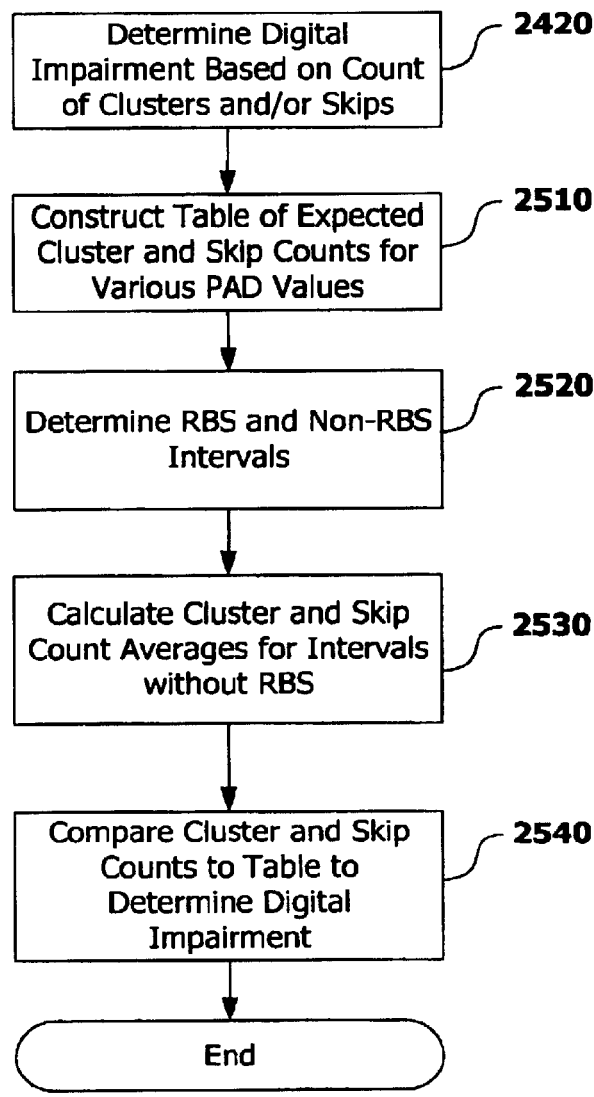
FIG. 11 is a flowchart illustrating operations for determining digital impairments based on counts of clusters and/or skips according to an embodiment of signature analysis.

Referring now to FIG. 11, more detailed operations for determining digital impairments based on counts of clusters and/or skips (Block 2420 of FIG. 10) now will be described. As shown in FIG. 11, at Block 2510, a table of expected cluster and skip counts is constructed for various PAD values. Then at Block 2520, RBS and non-RBS intervals are determined. At Block 2530, cluster and skip counts are averaged for non-RBS intervals. Finally, at Block 2540, the cluster and skip counts are averaged for non-RBS intervals. are compared to the values in the table, in order to determine the digital impairment. Each of Blocks 2510–2540 now will be described in greater detail.

Referring again to Block 2510, a table of expected cluster and/or skip counts is constructed for various PAD values. It will be understood that the table may be constructed offline and the resulting tables may be stored in the modem. Alternatively, tables may be constructed in the modem as needed. The table may be constructed using the following processing:

select PAD range (PAD_start to PAD_end) and step size (PAD_step)
initialize x_lin=all PCM codes from G.71 Ifor P=PAD_start to PAD_end
increment PAD_step {
 transmit x_lin to new PCM code with pad P,
  x_new=x_lin* 10^(-P/20)
 quantize the resulting PCM code to the nearest PCM code,
  x_output=Quant(x_new)
 compute counts of cluster and skip in the final PCM code between upper and lower limits.

Table 5 illustrates ideal cluster counts of a single PAD with no RBS, from 0.25 dB to 12 dB in 0.25 dB increments:

TABLE 5

| Pad Range | Cluster Counts (0.25 dB increments) | | | | | | | | | | | |
|---|---|---|---|---|---|---|---|---|---|---|---|---|
| 0.25–3 db | 5 | 5 | 6 | 5 | 8 | 9 | 10 | 11 | 10 | 13 | 11 | 12 |
| 3.25–6 Db | 14 | 11 | 11 | 11 | 10 | 9 | 10 | 8 | 7 | 6 | 4 | 4 |
| 6.25–9 dB | 4 | 5 | 6 | 8 | 10 | 10 | 11 | 12 | 13 | 14 | 15 | 15 |
| 9.25–12 db | 16 | 16 | 16 | 16 | 15 | 15 | 15 | 14 | 13 | 13 | 13 | 12 |

Table 6 illustrates ideal skip counts of single PAD with no RBS, from 0.25 dB to 12 dB in 0.25 dB increments:

TABLE 6

| Pad Range | Skip Counts (0.25 dB increments) | | | | | | | | | | | |
|---|---|---|---|---|---|---|---|---|---|---|---|---|
| 0.25–3 db | 4 | 4 | 6 | 4 | 7 | 7 | 9 | 10 | 9 | 12 | 9 | 11 |
| 3.25–6 Db | 12 | 10 | 9 | 10 | 8 | 7 | 8 | 6 | 5 | 3 | 0 | 0 |
| 6.25–9 dB | 0 | 1 | 1 | 2 | 4 | 4 | 4 | 5 | 6 | 6 | 7 | 6 |
| 9.25–12 db | 7 | 7 | 6 | 7 | 5 | 5 | 5 | 4 | 2 | 3 | 2 | 1 |

Table 7 illustrates ideal cluster counts of a tandem PAD with no RBS, from 2 dB to 6 dB in 1 dB increments:

TABLE 7

|  | 2 | 3 | 4 | 5 | 6 dB |
|---|---|---|---|---|---|
| 2 dB+ | 19 | 15 | 15 | 12 | 12 |
| 3 dB+ | 18 | 18 | 15 | 16 | 15 |
| 4 dB+ | 16 | 17 | 19 | 15 | 15 |
| 5 dB+ | 15 | 18 | 18 | 17 | 15 |
| 6 dB+ | 16 | 17 | 17 | 14 | 11 |

Table 8 illustrates ideal skip counts of tandem PAD with no RBS, from 2 dB to 6 dB in 1 dB increments:

TABLE 8

|  | 2 | 3 | 4 | 5 | 6 dB |
|---|---|---|---|---|---|
| 2 dB+ | 17 | 13 | 11 | 6 | 5 |
| 3 dB+ | 17 | 15 | 10 | 10 | 7 |
| 4 dB+ | 13 | 12 | 13 | 8 | 6 |
| 5 dB+ | 10 | 11 | 10 | 7 | 5 |
| 6 dB+ | 8 | 9 | 8 | 4 | 0 |

Other tables may be constructed as appropriate.

Referring again to FIG. 11, at Block 2520 RBS and non-RBS intervals are determined. In particular, with the tables from the ideal model, thresholds may be set for determination of RBS and non-RBS intervals based on the cluster and/or skip counts for each interval. For example, when using PCM codes from 108 to 32 as described above, an interval may be considered to be an RBS interval if its cluster counts are greater than 21 or its skip counts are greater than 19. These large cluster and/or skip counts may be caused by RBS because RBS can cause the folding of adjacent PCM code points which may create skips and clusters.

Referring to Block 2530, cluster and skip count averages are then determined for intervals without RBS. In Block 2540, the digital impairments are determined utilizing the averages calculated in Block 2530. In particular, search intervals for both cluster (c) and skip (s) are determined by adding one to and subtracting one from the average cluster count (c_cnt) and average skip count (s_cnt), i.e., c=(c_cnt−1, c_cnt+1) and s=(s_cnt−1, s_cnt+1) to take noise into consideration. If c=0 and s=0 then the PAD interval=(0, 0.25). Otherwise, all single PAD intervals are found which are within a threshold, e.g., 2, of c and s simultaneously and reported. Final single PAD intervals which are +/−0.25 dB of the reported single PAD intervals are identified. All tandem PADs are found which are within a threshold, e.g., 2, of c and s simultaneously.

A more detailed description of an embodiment for computing cluster and skip counts from PCM codes 108 to 32, corresponding to Block 2410 of FIG. 10 above, now will be described. There are 128 PCM codes defined in G.711, divided into 8 data segments. Each segment has 16 PCM codes and therefore has 15 spaces. A space is defined as the distance between two adjacent PCM codes. All spaces in one data segment are the same. Let S(j) and S(j−1) be the spaces of data segment j and its next smaller data segment j−1, and Bj be the boundary space in the two data segments. Then S(j)/S(j−1)=1/2 and Bj/S(j)=3/4 according to G.711. Space between two consecutive PCM codes in the same data segment may be used to calculate counts. Since the smaller PCM codes may be more sensitive to noise, the calculation may be performed from the larger PCM code (108) to the smaller one (32) so that the space information in one data segment (larger) can be used as guidance for the calculation of space in a next data segment (smaller). Another issue in the calculation of cluster and skip counts is the boundary location of each data segment. Spaces and boundaries may be calculated as follows:

```
for mapping interval 1 to 6 {
    compute space within the G.711 segment which con-
        tains PCM code 108 for PCM code=108 to PCM
        code 32{
        determine space type (normal, cluster, skip, or
            boundary) for the space between current PCM
            code and the next smaller one increment space,
            cluster and skip counts accordingly if a boundary
            is found {
            compute base (the largest number) of the next
                data segment
            compute space within the next data segment
        }
    }
}
```

Figure 12:
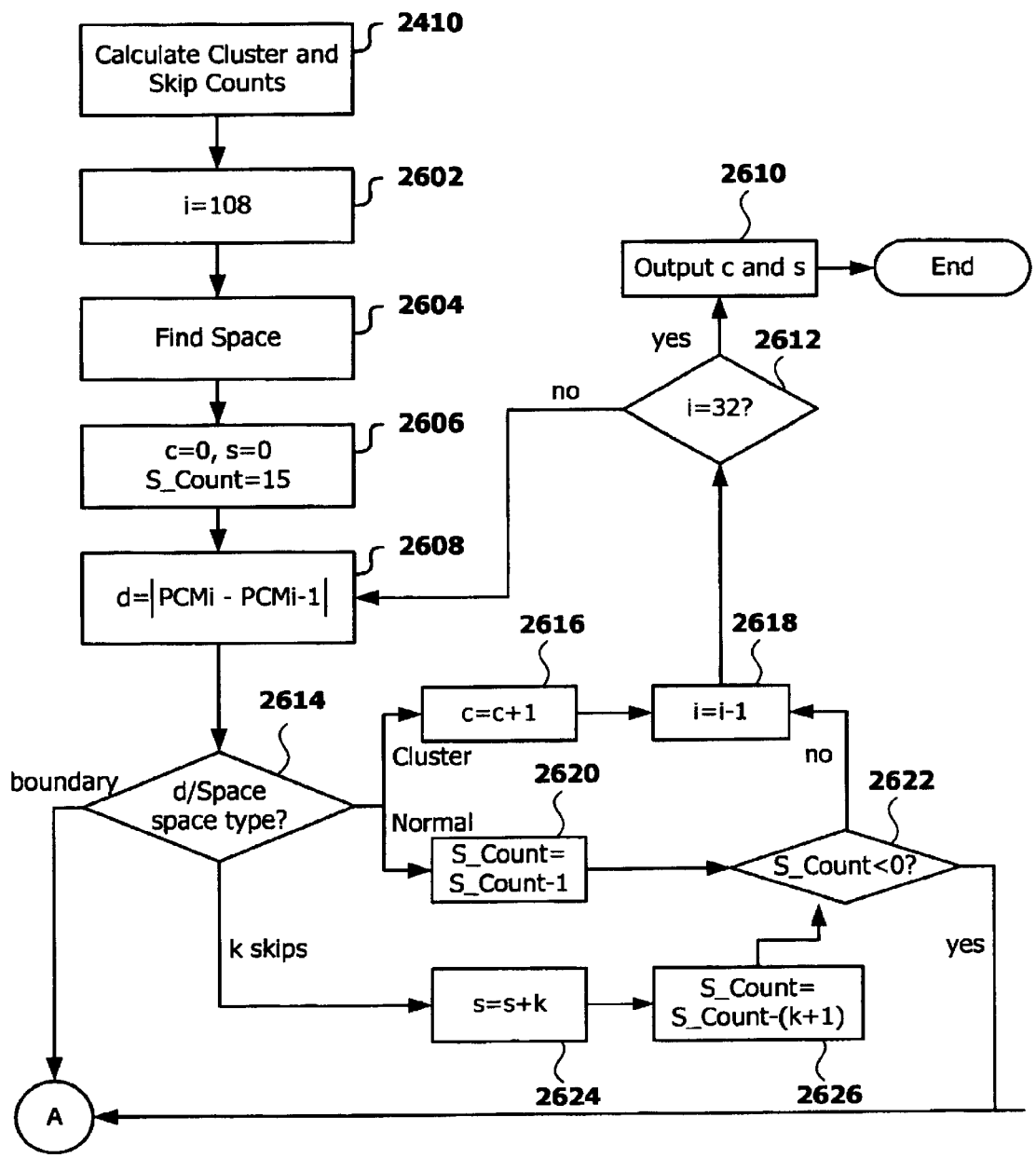
FIG. 12 is a flowchart illustrating operations for calculating cluster and skip counts in one mapping interval according to an embodiment of signature analysis.
Figure 12:
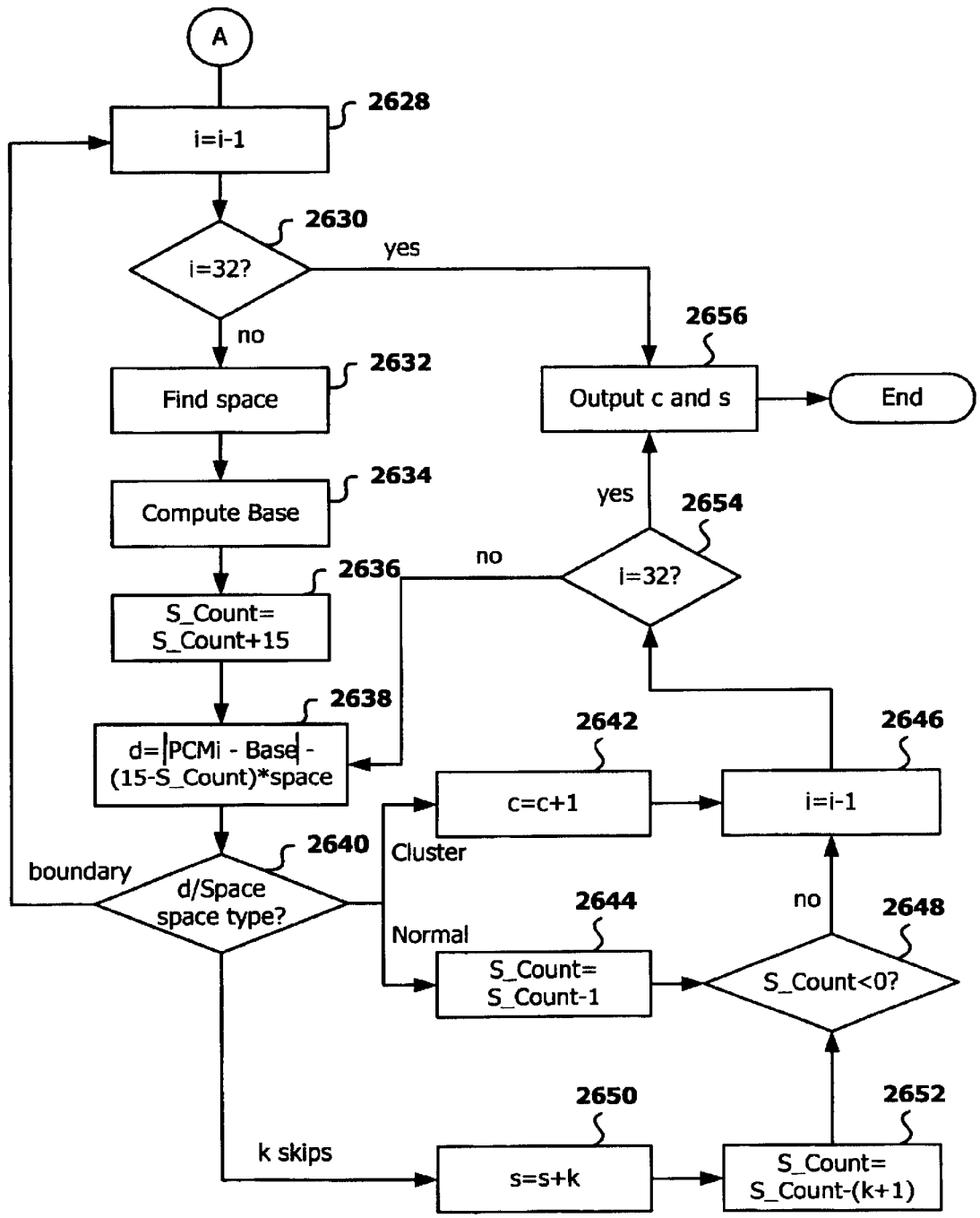

FIG. 12 is a flowchart of an embodiment for calculating cluster and skip counts in one mapping interval, corresponding to Block 2410 of FIG. 10. In FIG. 12, c denotes cluster counts, s denotes skip counts, and S_Count denotes space counts in the data segment.

Referring now to FIG. 12, variable i, which is a pointer tot eh current ucode, is set to 108 as the initial ucode to be processed at Block 2602, and at Block 2604, the component "find space" (described in detail below) is executed. At Block 2606, cluster count c is set to 0, skip count s is set to 0 and space count S_Count is set to 15. At Block 2608, a distance measurement is defined where the distance is the distance between ucode(i) and ucode(i−1).

At Block 2614, a test is made as to the space type based on the processing described in detail below. At Block 2616, if it is a cluster, the cluster count is incremented and the variable i is decremented at Block 2618. If i is 32 at Block 2612, then c and s are output at Block 2610 and operations end. If not, then a new distance measurement is computed at Block 2608, and a test again is made at Block 2614.

If the test at Block 2614 determines that a normal boundary is present, then the space count is decremented at Block 2620. As long as the space count is 0 or more, processing continues at Block 2618.

Referring again to Block 2614, if the test at Block 2614 determines that a boundary is present, then the variable i is decremented at Block 2628 and a test is made at Block 2630 as to whether i is 32. If i is 32, then the cluster count and skip count are output at Block 2656 and operations end. On the other hand, if i is not 32 at Block 2630, then the "find space" operation is again performed at Block 2632 and a base is computed at Block 2634. The space count then is incremented by 15 at Block 2636 and a distance measurement is made at Block 2638.

Referring now to Block 2640, a test again is made as to the space type. If a cluster, then the cluster count is incremented and the variable i is decremented at Blocks 2642 and 2646, and if the variable i is equal to 32, the cluster count and skip count are output at Block 2656. If the variable i is not 32 at Block 2654, then the distance measurement is performed again at Block 2638 and the space type is identified again at Block 2640.

If the space type is normal, then the space count is decremented at Block 2644. If the space count is less than 0 at Block 2648, then the variable i is decremented at Block 2628 and processing continues. On the other hand, if the space count is not less than 0 at Block 2648, then the variable i is decremented at Block 2646.

Referring again to Block 2640, if the space type is a boundary, then the variable i is decremented at Block 2628 and operations continue. On the other hand, if the space type is k skips at Block 2640, then k is added to the number of skip counts at Block 2650 and the space count is decremented by k+1 at Block 2652. Accordingly, cluster and skip counts are computed.

An embodiment for finding a space (Blocks 2604 and 2632 of FIG. 12) now will be described. Let S(j), S(j−1), and B(j) are defined as above. If a boundary or skip is found in the first 6 spaces from PCM codes 108 to 102, then the space, S, of the PCM curve segment containing PCM code 108 can be set accordingly. The space can be determined as a boundary or skip based on three consecutive non-cluster spaces, say d1, d2, d3:

if d1/d2=3/4 and d2/d3=2, then d1=B(j), d2=S(j−1)+S(j−1), and d3=S(j−1), S=d2 if d1/d2=4/5 and d2/d3=5/2, then d1=S(j), d2=B(j)+S(j−1), d3=(j−1), S=d1/2 if d1/d2=8/9, then d1=S(j)+S(j), d2=S(j)+B(j)+S(j−1), d3=S(j−1), S=d1/2 if d1/d2=4/3, then d1=S(j), d2=B(j), S=d1 if d1/d2=3/2, then d1=B(j), d2=S(j−1), S=2*d2 if d1/d2=2, then d1=S(j)+S(j), d2=S(j), S=d/2 if d1/d2=9/4, then d1=S(j), d2=S(j)+B(j)+S(j−1), S=d1 if d1/d2=5/2, then d1=B(j)+S(j−1), d2=S(j−1), S=2*d2 if d1/d2=7/2, then d1=S(j)+B(j), d2=S(j−1), S=2*d2

}

Note that due to the noise in the network, the ratio of d1/d2 generally will not be exactly the ideal case. The mid point of the two adjacent numbers may be set as the cut off point for the decision of the ratio.

If the PCM code is not in the PCM curve segment containing PCM code 108, or no boundary or skip is found in the space between PCM code 108 to 102

{ calculate space in current data segment by

{ select all space if u*S(j)<=d<=1*S(j) where SO) the space in previous data segment and S(j)=1000
  if PCM code=108), and (u, 1)=(0.55, 0.45) for PCM
    !=108 and (u, 1)=(0.8, 0.2) if PCM=108 set space to be average of all selected spaces
}
}

Detailed processing for determining whether a space is normal cluster, skip or boundary (Blocks 2614 and 2640 of FIG. 12) now will be provided:

if the PCM curve segment contains PCM code 108
{let d=the space between two consecutive PCM codes
calculate d/S
determine space type as described below
else if the PCM curve segment does not contain PCM code 108
   let d=the space between the PCM code and the base of the
     data segment (15-space counts)*space
   calculate d/S
   determine space type as described below.
Space type may be determined using the following operations:
   cluster if d/S=0, d=0
     increment cluster count by
   normal if d/S=1, d=S(j)
     if S_Count==0
       reset S_Count to 15
       calculate space 5
       calculate base
     else
       decrement S_Count by 1
     end
   normal if d/S=3/4, d=B(j)
     if S_Count=0
       reset S_Count to 15
       calculate space S
       calculate base
     else
       decrement S_Count by 1
     end
   1 skip if d/S=2, d=S(j)+S(j)
     increment skip count by 1
     if S_Count<=1
       set S_Count=14+S_Count
       calculate space S
       calculate base
     else
       decrement S_Count by 2
     end
   1 skip if d/S=7/4, d=S(j)+B(j) or 2 skip, d=Bo)+S(j-1)+
     S(j-1)
     if S_Count==1
     increment skip count by 1
     reset S_Count to 15
     calculate space S
     calculate base
   elseif S_Count==0
     increment skip count by 2
     reset S_Count to 13
     calculate space S
     calculate base
   elseif S_Count>=2
     increment skip count by 1
   decrement S_Count by 2
   end
   1 skip if d/S=5/4, d=BO)+S(j-1)
     if S_Count=0
       increment skip count by 1
       reset S_Count to 14
       calculate space S
       calculate base
     else
       decrement S_Count by 1
     end
   2 skips if d/S=3, d=S(j)+S(j)+S(j)
     increment skip count by 2
     if S_Count<=2
       set S_Count=13+S_Count
       calculate space S
       calculate base
     else
       decrement S_Count by 3
     end
   2 skips if d/S=1 1/4, d=S(j)+S(j)+B(j)
     increment skip count by 2
     if S_Count<=2
       set S_Count=13+S_Count
       calculate space S
       calculate base
     else
       decrement S_Count by 3
     end
   2 skips if d/S=9/4, d=S(j)+B(j)+S(j-1)
     if S_Count==1
       increment skip count by 2
       set S_Count=13+S_Count
       calculate space S
       calculate base
     else
       increment skip count by 1
       decrement S_Count by 2
     end
}

Note that due to the noise in the network, the ratio of d/S generally will not be exactly the ideal case. The mid point of the two adjacent numbers may be set as the cut off point for the decision of the ratio.

Signature analysis can be relatively insensitive to a precise network model being known a priori. Although signature analysis may not exhibit the accuracy of a priori digital impairment detection techniques, it may not exhibit gross errors when an unknown network model is encountered, such as tandem PADs or a type of transcoding between Alaw and µlaw. An accuracy of about 0.5 dB to about 1.0 dB may be obtained.

Signature analysis can be less sensitive than a precise a priori knowledge of a network because there generally is a smooth overlap or continuum across various cluster counts from a PAD value of 0 dB increasing to a PAD value of about 12 dB. Similarly, for tandem PAD combinations such as 6 dB and 6 dB in the network, an approximate PAD estimation of 11 to 12 dB may be obtained. In sharp contrast, a priori approaches may be confused by tandem PADs unless the precise tandem PAD combination is known a priori. As such, if a priori knowledge of an unusual network scenario, such as tandem PADs is not known, an a priori approach may determine that the two 6 dB PADs in tandem are just one 6 dB PAD, and the power boost may be 6 dB lower than desired.

Signature analysis also can handle unusual uchord spacings that may violate G.711 rules. One example of this is a 3 dB type F PAD found in Raleigh and Cary, N.C. The lowest six uchords correspond to the normal G.711 spacing, but the top uchords are separated in a manner inconsistent with G.711. Signature analysis can recalibrate the predicted spacing between points in determining skip and cluster counts at each uchord boundary. Thus, signature analysis can find an approximate PAD value of around 3 dB. In contrast, an a priori technique may identify a 4 dB or 5 dB PAD.

Finally, signature analysis can be computationally efficient because it only needs to compare signatures rather than comparing an entire range of PCM codes for each DIL level. High speed modem initialization thereby may be provided.

The flow charts of FIGS. 4–12 illustrated the architecture, functionality and operation of a possible implementation of the Phase 3 Digital Impairment Learning software 176. In this regard, each block can represents a module, segment, or portion of code, which can comprise one or more executable instructions for implementing the specified logical function (s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of identifying a digital impairment in a set of Pulse Code Modulation (PCM) signal levels that are received at a client modem from a server modem, comprising the steps of:
   performing signature analysis of the set of PCM signal levels to identify a range of candidate digital impairments; and
   performing PCM signal level comparison analysis for the set of PCM signal levels over the range of candidate digital impairments to identify the digital impairment.

2. A method according to claim 1 wherein the digital impairments include single PAD and tandem PAD (Packet Assembler/Disassembler) digital impairments, the method further comprising the step of:
   performing PCM signal level comparison analysis for the set of PCM signal levels for a plurality of possible tandem PAD digital impairments if the step of performing signature analysis identifies a tandem PAD digital impairment.

3. A method according to claim 1 wherein the step of performing signature analysis comprises the steps of:
   compressing the set of PCM signal levels into a signature; and
   determining a digital impairment in the set of PCM signal levels based on the signature.

4. A method according to claim 3 wherein the signature comprises a count of clusters and/or skips in the set of PCM signal levels.

5. A method according to claim 1 wherein the set of PCM signal levels comprises a plurality of sets of Digital Impairment Learning (DIL) signals that are repeatedly transmitted from the server modem to the client modem over a corresponding plurality of DIL intervals.

6. A method according to claim 3 wherein the step of determining comprises the steps of:
   obtaining models of cluster counts and/or skip counts for a plurality of digital impairments; and
   comparing the clusters and/or skips that are counted in the set of PCM signal levels that are received at the client modem from the server modem, to the models of cluster counts and/or skip counts to identify a digital impairment.

7. A method according to claim 1 wherein the step of performing PCM signal level comparison analysis comprises the steps of:
   computing sums of squares of differences between the PCM signal levels and sets of model PCM signal levels having the range of candidate digital impairments; and
   selecting a set of model PCM signal levels based on the sums of squares of differences so computed.

8. A method of identifying digital impairment in a set of Pulse Code modulation (PCM) signal levels that are received at a client modem from a server modem, comprising the steps of:
   performing signature analysis of the set of PCM signal levels to identify a signature analysis candidate digital impairment;
   performing PCM signal level comparison analysis for the set of PCM signal levels to identify a level comparison candidate digital impairment;
   determining whether at least one criterion is met;
   identifying the level comparison candidate digital impairment as the digital impairment in the set of PCM signal levels if the at least one criterion is met; and
   identifying the signature analysis candidate digital impairment as the digital impairment in the set of PCM signal levels if the at least one criterion is not met.

9. A method according to claim 8 wherein the step of performing signature analysis comprises the steps of:
   performing signature analysis of the set of PCM signal levels to identify a range of signature analysis candidate digital impairments; and
   post processing the range of signature analysis candidate digital impairments to identify the signature analysis candidate digital impairment.

10. A method according to claim 8 wherein the step of determining whether at least one criterion is met comprises the step of determining whether at least one of the following criterion is met:
    a transcoding flag is set;
    an Alaw flag is set;
    the step of performing signature analysis does not identify a signature analysis candidate Robbed Bit Signal (RBS) digital impairment;
    the step of performing signature analysis does not identify a signature analysis candidate PAD digital impairment;
    a difference between the signature analysis candidate digital impairment and the level comparison candidate digital impairment exceeds a threshold;
    the level comparison candidate PAD digital impairment is 4.5 dB; and
    the signature analysis candidate digital impairment and the level comparison candidate digital impairment both include a non-RBS interval.

11. A method according to claim 9:
    wherein the step of performing signature analysis comprises the steps of accumulating cluster counts and skip counts for the PCM signal levels and comparing the cluster counts and skip counts so accumulated to models of cluster and skip counts to identify a range of signature analysis candidate digital impairments; and wherein the step of post processing comprises at least one of the steps of:

identifying a signature analysis candidate PAD impairment as 0 dB if there are no accumulated cluster and skip counts;

identifying an average of tandem PAD digital impairments as the signature analysis candidate PAD digital impairment if a single PAD impairment is not identified;

identifying a midpoint of a single range of signature analysis PAD digital impairments if the single range of signature analysis PAD digital impairments is present;

identifying a midpoint of a second range of signature analysis PAD digital impairments if a first range and the second range of signature analysis PAD digital impairments are present and tandem PAD digital impairments are identified;

identifying a midpoint of a first range of signature analysis PAD digital impairments if the first range and a second range of signature analysis PAD digital impairments are present, tandem PAD digital impairments are not identified and a difference between the cluster counts and skip counts is less than two; and identifying a midpoint of a first, second or third range of signature analysis PAD digital impairments based upon the difference between the cluster counts and skip counts.

12. A method according to claim 8 wherein the step of performing signature analysis comprises the steps of:

compressing the set of PCM signal levels into a signature; and determining a digital impairment in the set of PCM signal levels based on the signature.

13. A method according to claim 12 wherein the signature comprises a count of clusters and/or skips in the set of PCM signal levels.

14. A method according to claim 8 wherein the set of PCM signal levels comprises a plurality of sets of Digital Impairment Learning (DIL) signals that are repeatedly transmitted from the server modem to the client modem over a corresponding plurality of DIL intervals.

15. A method according to claim 12 wherein the step of determining comprises the steps of:

obtaining models of cluster counts and/or skip counts for a plurality of digital impairments; and comparing the clusters and/or skips that are counted in the set of PCM signal levels that are received at the client modem from the server modem, to the models of cluster counts and/or skip counts for a plurality of digital impairments to identify a digital impairment.

16. A method according to claim 8 wherein the step of performing PCM signal level comparison analysis comprises the steps of:

computing sums of squares of differences between the PCM signal levels and sets of model PCM signal levels having the range of candidate digital impairments; and selecting a set of model PCM signal levels based on the sums of squares of differences so computed.

17. A modem comprising:

means for receiving a set of Pulse Code Modulation (PCM) signal levels from a server modem;

means for performing signature analysis of the set of PCM signal levels to identify a range of candidate digital impairments; and means for performing PCM signal level comparison analysis for the set of PCM signal levels over the range of candidate digital impairments to identify the digital impairment.

18. A modem according to claim 17 wherein the digital impairments include single PAD and tandem PAD digital impairments, the modem further comprising:

means for performing PCM signal level comparison analysis for the set of PCM signal levels for a plurality of possible tandem PAD digital impairments in response to the means for performing signature analysis identifying a tandem PAD digital impairment.

19. A modem according to claim 17 wherein the means for performing signature analysis comprises:

means for compressing the set of PCM signal levels into a signature; and means for determining a digital impairment in the set of PCM signal levels based on the signature.

20. A modem according to claim 19 wherein the signature comprises a count of clusters and/or skips in the set of PCM signal levels.

21. A modem according to claim 17 wherein the set of PCM signal levels comprises a plurality of sets of Digital Impairment Learning (DIL) signals that are repeatedly transmitted from the server modem to the modem over a corresponding plurality of DIL intervals.

22. A modem according to claim 19 wherein the means for determining comprises:

means for obtaining models of cluster counts and/or skip counts for a plurality of digital impairments; and means for comparing the clusters and/or skips that are counted in the set of PCM signal levels that are received at the modem from the server modem, to the models of cluster counts and/or skip counts to identify a digital impairment.

23. A modem according to claim 17 wherein the means for performing PCM signal level comparison analysis comprises:

means for computing sums of squares of differences between the PCM signal levels and sets of model PCM signal levels having the range of candidate digital impairments; and means for selecting a set of model PCM signal levels based on the sums of squares of differences so computed.

24. A modem comprising:

means for receiving a set of Pulse Code modulation (PCM) signal levels from a server modem:

means for performing signature analysis of the set of PCM signal levels to identify a signature analysis candidate digital impairment;

means for performing PCM signal level comparison analysis for the set of PCM signal levels to identify a level comparison candidate digital impairment;

means for determining whether at least one criterion is met;

means for identifying the level comparison candidate digital impairment as the digital impairment in the set of PCM signal levels if the at least one criterion is met; and means for identifying the signature analysis candidate digital impairment as the digital impairment in the set of PCM signal levels if the at least one criterion is not met.

25. A modem according to claim 24 wherein the means for performing signature analysis comprises:

means for performing signature analysis of the set of PCM signal levels to identify a range of signature analysis candidate digital impairments; and means for post processing the range of signature analysis candidate digital impairments to identify the signature analysis candidate digital impairment.

26. A modem according to claim 24 wherein the means for determining whether at least one criterion is met comprises means for determining whether at least one of the following criterion is met:

a transcoding flag is set;

an Alaw flag is set;

the step of performing signature analysis does not identify a signature analysis candidate Robbed Bit Signal (RBS) digital impairment;

the step of performing signature analysis does not identify a signature analysis candidate PAD digital impairment;

a difference between the signature analysis candidate digital impairment and the level comparison candidate digital impairment exceeds a threshold;

the level comparison candidate PAD digital impairment is 4.5 dB; and the signature analysis candidate digital impairment and the level comparison candidate digital impairment both include a non-RBS interval.

27. A modem according to claim 25:

wherein the means for performing signature analysis comprises means for accumulating cluster counts and skip counts for the PCM signal levels and for comparing the cluster counts and skip counts so accumulated to models of cluster and skip counts to identify a range of signature analysis candidate digital impairments; and wherein the means for post processing comprises:

means for identifying a signature analysis candidate PAD impairment as 0 dB if there are no accumulated cluster and skip counts;

means for identifying an average of tandem PAD digital impairments as the signature analysis candidate PAD digital impairment if a single PAD impairment is not identified;

means for identifying a midpoint of a single range of signature analysis PAD digital impairments if the single range of signature analysis PAD digital impairments is present;

means for identifying a midpoint of a second range of signature analysis PAD digital impairments if a first range and the second range of signature analysis PAD digital impairments are present and tandem PAD digital impairments are identified;

means for identifying a midpoint of a first range of signature analysis PAD digital impairments if the first range and a second range of signature analysis PAD digital impairments are present, tandem PAD digital impairments are not identified and a difference between the cluster counts and skip counts is less than two; and means for identifying a midpoint of a first, second or third range of signature analysis PAD digital impairments based upon the difference between the cluster counts and skip counts.

28. A modem according to claim 24 wherein the means for performing signature analysis comprises:

means for compressing the set of PCM signal levels into a signature; and means for determining a digital impairment in the set of PCM signal levels based on the signature.

29. A modem according to claim 28 wherein the signature comprises a count of clusters and/or skips in the set of PCM signal levels.

30. A modem according to claim 24 wherein the set of PCM signal levels comprises a plurality of sets of Digital Impairment Learning (DIL) signals that are repeatedly transmitted from the server modem to the client modem over a corresponding plurality of DIL intervals.

31. A modem according to claim 24 wherein the means for determining comprises:

means for obtaining models of cluster counts and/or skip counts for a plurality of digital impairments; and means for comparing the clusters and/or skips that are counted in the set of PCM signal levels that are received at the modem from the server modem, to the models of cluster counts and/or skip counts for a plurality of digital impairments to identify a digital impairment.

32. A modem according to claim 24 wherein the means for performing PCM signal level comparison analysis comprises:

means for computing sums of squares of differences between the PCM signal levels and sets of model PCM signal levels having the range of candidate digital impairments; and means for selecting a set of model PCM signal levels based on the sums of squares of differences so computed.

33. A computer program product for identifying a digital impairment in a set of Pulse Code Modulation (PCM) signal levels that are received at a client modem from a server modem, the computer program product comprising a computer-readable storage medium having computer-readable program code embodied in the medium, the computer-readable program code comprising:

computer-readable program code for performing signature analysis of the set of PCM signal levels to identify a range of candidate digital impairments; and computer-readable program code for performing PCM signal level comparison analysis for the set of PCM signal levels over the range of candidate digital impairments to identify the digital impairment.

34. A computer program product according to claim 33 wherein the digital impairments include single PAD and tandem PAD digital impairments, the computer program product further comprising:

computer-readable program code for performing PCM signal level comparison analysis for the set of PCM signal levels for a plurality of possible tandem PAD digital impairments in response to the computer-readable program code for performing signature analysis identifies a tandem PAD digital impairment.

35. A computer program product according to claim 33 wherein the computer-readable program code for performing signature analysis comprises:

computer-readable program code for compressing the set of PCM signal levels into a signature; and computer-readable program code for determining a digital impairment in the set of PCM signal levels based on the signature.

36. A computer program product according to claim 35 wherein the signature comprises a count of clusters and/or skips in the set of PCM signal levels.

37. A computer program product according to claim 33 wherein the set of PCM signal levels comprises a plurality of sets of Digital Impairment Learning (DIL) signals that are repeatedly transmitted from the server modem to the modem over a corresponding plurality of DIL intervals.

38. A computer program product according to claim 35 wherein the computer-readable program code for determining comprises:

computer-readable program code for obtaining models of cluster counts and/or skip counts for a plurality of digital impairments; and computer-readable program code for comparing the clusters and/or skips that are counted in the set of PCM signal levels that are received at the modem from the server modem, to the models of cluster counts and/or skip counts to identify a digital impairment.

39. A computer program product according to claim 33 wherein the computer-readable program code for performing PCM signal level comparison analysis comprises:

computer-readable program code for computing sums of squares of differences between the PCM signal levels and sets of model PCM signal levels having the range of candidate digital impairments; and computer-readable program code for selecting a set of model PCM signal levels based on the sums of squares of differences so computed.

40. A computer program product for identifying digital impairment in a set of Pulse Code modulation (PCM) signal levels that are received at a client modem from a server modem, the computer program product comprising a computer-readable storage medium having computer-readable program code embodied in the medium, the computer-readable program code comprising:

computer-readable program code for performing signature analysis of the set of PCM signal levels to identify a signature analysis candidate digital impairment;

computer-readable program code for performing PCM signal level comparison analysis for the set of PCM signal levels to identify a level comparison candidate digital impairment;

computer-readable program code for determining whether at least one criterion is met;

computer-readable program code for identifying the level comparison candidate digital impairment as the digital impairment in the set of PCM signal levels if the at least one criterion is met; and computer-readable program code for identifying the signature analysis candidate digital impairment as the digital impairment in the set of PCM signal levels if the at least one criterion is not met.

41. A computer program product according to claim 40 wherein the computer-readable program code for performing signature analysis comprises:

computer-readable program code for performing signature analysis of the set of PCM signal levels to identify a range of signature analysis candidate digital impairments; and computer-readable program code for post processing the range of signature analysis candidate digital impairments to identify the signature analysis candidate digital impairment.

42. A computer program product according to claim 40 wherein the computer-readable program code for determining whether at least one criterion is met comprises the computer-readable program code for determining whether at least one of the following criterion is met:

a transcoding flag is set;

an Alaw flag is set;

the step of performing signature analysis does not identify a signature analysis candidate Robbed Bit Signal (RBS) digital impairment;

the step of performing signature analysis does not identify a signature analysis candidate PAD digital impairment;

a difference between the signature analysis candidate digital impairment and the level comparison candidate digital impairment exceeds a threshold;

the level comparison candidate PAD digital impairment is 4.5 dB; and the signature analysis candidate digital impairment and the level comparison candidate digital impairment both include a non-RBS interval.

43. A computer program product according to claim 41:

wherein the computer-readable program code for performing signature analysis comprises the computer-readable program code for accumulating cluster counts and skip counts for the PCM signal levels and comparing the cluster counts and skip counts so accumulated to models of cluster and skip counts to identify a range of signature analysis candidate digital impairments; and wherein the computer-readable program code for post processing comprises:

computer-readable program code for identifying a signature analysis candidate PAD impairment as 0 dB if there are no accumulated cluster and skip counts;

computer-readable program code for identifying an average of tandem PAD digital impairments as the signature analysis candidate PAD digital impairment if a single PAD impairment is not identified;

computer-readable program code for identifying a midpoint of a single range of signature analysis PAD digital impairments if the single range of signature analysis PAD digital impairments is present;

computer-readable program code for identifying a midpoint of a second range of signature analysis PAD digital impairments if a first range and the second range of signature analysis PAD digital impairments are present and tandem PAD digital impairments are identified;

computer-readable program code for identifying a midpoint of a first range of signature analysis PAD digital impairments if the first range and a second range of signature analysis PAD digital impairments are present, tandem PAD digital impairments are not identified and a difference between the cluster counts and skip counts is less than two; and computer-readable program code for identifying a midpoint of a first, second or third range of signature analysis PAD digital impairments based upon the difference between the cluster counts and skip counts.

44. A computer program product according to claim 40 wherein the computer-readable program code for performing signature analysis comprises:

computer-readable program code for compressing the set of PCM signal levels into a signature; and computer-readable program code for determining a digital impairment in the set of PCM signal levels based on the signature.

45. A computer program product according to claim 44 wherein the signature comprises a count of clusters and/or skips in the set of PCM signal levels.

46. A computer program product according to claim 40 wherein the set of PCM signal levels comprises a plurality of sets of Digital Impairment Learning (DIL) signals that are repeatedly transmitted from the server modem to the client modem over a corresponding plurality of DIL intervals.

47. A computer program product according to claim 44 wherein the computer-readable program code for determining comprises:

computer-readable program code for obtaining models of cluster counts and/or skip counts for a plurality of digital impairments; and computer-readable program code for comparing the clusters and/or skips that are counted in the set of PCM signal levels that are received at the client modem from the server modem, to the models of cluster counts and/or skip counts for a plurality of digital impairments to identify a digital impairment.

48. A computer program product according to claim 40 wherein the computer-readable program code for performing PCM signal level comparison analysis comprises:

computer-readable program code for computing sums of squares of differences between the PCM signal levels and sets of model PCM signal levels having the range of candidate digital impairments; and computer-readable program code for selecting a set of model PCM signal levels based on the sums of squares of differences so computed.

* * * * *